United States Patent
Klein et al.

(10) Patent No.: US 7,475,175 B2
(45) Date of Patent: *Jan. 6, 2009

(54) MULTI-PROCESSOR MODULE

(75) Inventors: David A. Klein, Carrollton, TX (US); Christian L. Belady, McKinney, TX (US); Shaun L. Harris, McKinney, TX (US); Michael C. Day, Allen, TX (US); Jeffrey P. Christenson, Plano, TX (US); Brent A. Boudreaux, Highland Village, TX (US); Stuart C. Haden, Allen, TX (US); Eric Peterson, McKinney, TX (US); Jeffrey N. Metcalf, Frisco, TX (US); James S. Wells, Windsor, CO (US); Gary W. Williams, Rowlett, TX (US); Paul A. Wirtzberger, Greenville, TX (US); Roy M. Zeighami, McKinney, TX (US); Greg Huff, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 601 days.

This patent is subject to a terminal disclaimer.

(21) Appl. No.: 10/800,837

(22) Filed: Mar. 15, 2004

(65) Prior Publication Data

US 2004/0225821 A1     Nov. 11, 2004

Related U.S. Application Data

(60) Provisional application No. 60/455,605, filed on Mar. 17, 2003.

(51) Int. Cl.
  *H01L 23/34*     (2006.01)
  *H01L 23/12*     (2006.01)
  *H05K 7/20*      (2006.01)
  *G06F 13/00*     (2006.01)

(52) U.S. Cl. .................. 710/100; 257/706; 257/711; 361/702; 361/707; 361/719

(58) Field of Classification Search ......... 257/701–702, 257/704, 706–707, 710–713, 719; 361/702, 361/704, 707, 710, 719, 728, 730, 731, 683, 361/687; 710/100; 174/16.3; 165/80.2, 165/80.3

See application file for complete search history.

(56) References Cited

U.S. PATENT DOCUMENTS

| | | | |
|---|---|---|---|
| 5,761,516 A | * | 6/1998 | Rostoker et al. ............. 710/260 |
| 5,805,915 A | * | 9/1998 | Wilkinson et al. ............ 712/20 |
| 5,859,975 A | | 1/1999 | Brewer et al. |
| 5,901,040 A | | 5/1999 | Cromwell et al. |
| 6,191,945 B1 | | 2/2001 | Belady et al. |
| 6,285,550 B1 | | 9/2001 | Belady |
| 6,341,334 B1 | | 1/2002 | Kamemaru |
| 6,452,113 B2 | | 9/2002 | Dibene, II et al. |
| 6,470,408 B1 | | 10/2002 | Morrison et al. |
| 6,771,507 B1 | | 8/2004 | Belady et al. |
| 6,819,562 B2 | | 11/2004 | Boudreaux et al. |

(Continued)

OTHER PUBLICATIONS

Intel Itanium Architecture Software Developer's Manual, vol. 2: System Architecture, Revision 2.1, Oct. 2002, 11 pages.

*Primary Examiner*—Mark Rinehart
*Assistant Examiner*—Jeremy S Cerullo

(57) ABSTRACT

An apparatus comprises a plurality of logically independent processors, a system bus, and a cache control and bus bridge device in communication with the plurality of processors such that the cache control and bus bridge device is logically interposed between the processors and the system bus, and wherein the processors and cache control and bus bridge device are disposed in a module form factor such that the apparatus is a drop-in replacement for a standard single processor module.

40 Claims, 12 Drawing Sheets

U.S. PATENT DOCUMENTS

| | | |
|---|---|---|
| 6,969,261 B2 | 11/2005 | Harris et al. |
| 7,018,215 B2 | 3/2006 | Williams et al. |
| 7,072,185 B1 * | 7/2006 | Belady et al. ............... 361/704 |
| 7,079,386 B1 * | 7/2006 | Jochym et al. .............. 361/687 |
| 7,146,488 B2 | 12/2006 | Culter et al. |
| 2001/0042189 A1 | 11/2001 | Babaian et al. |
| 2003/0088800 A1 * | 5/2003 | Cai ........................... 713/320 |
| 2003/0150605 A1 | 8/2003 | Belady et al. |
| 2004/0054937 A1 | 3/2004 | Williams et al. |
| 2004/0156676 A1 | 8/2004 | Boudreaux et al. |

* cited by examiner

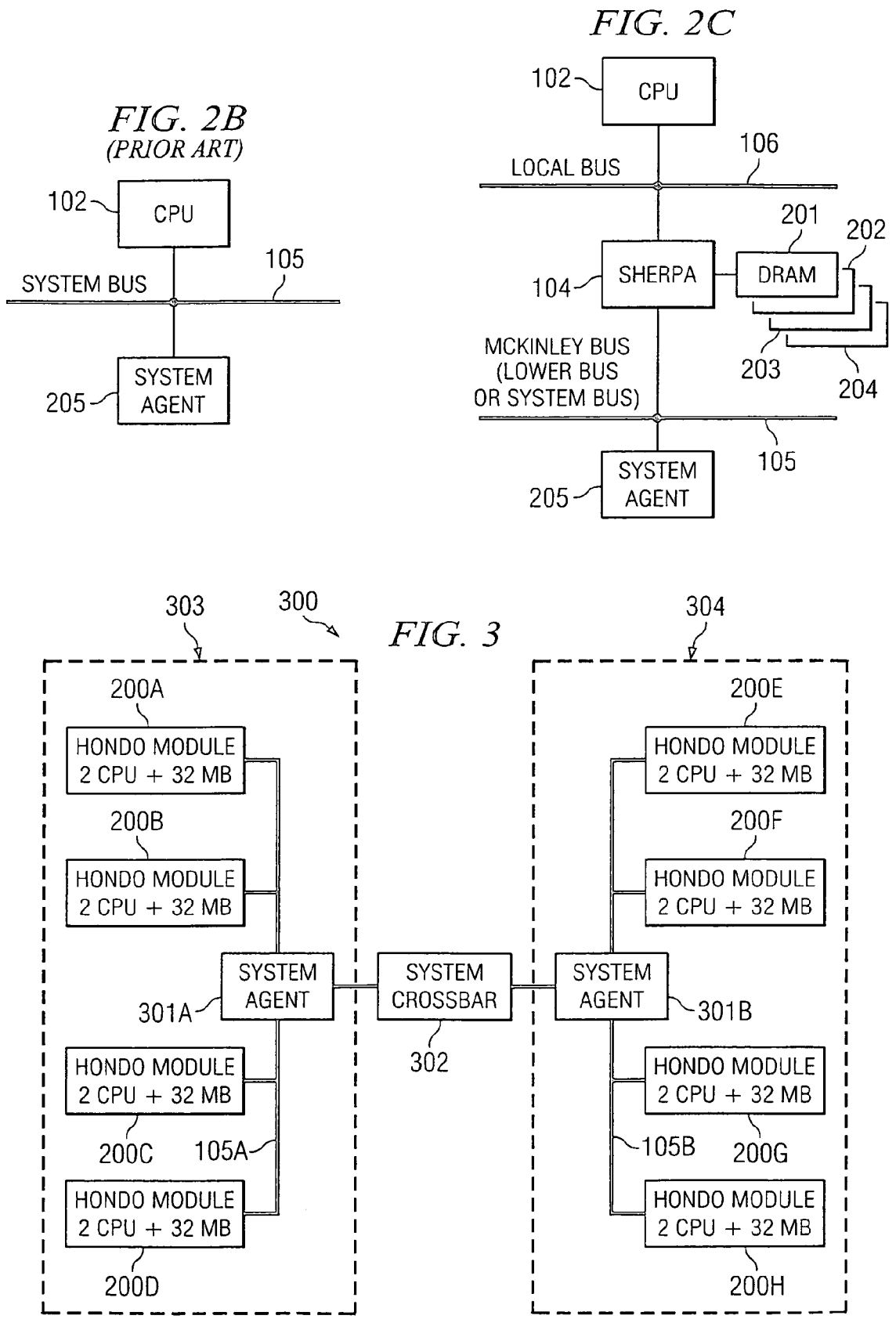

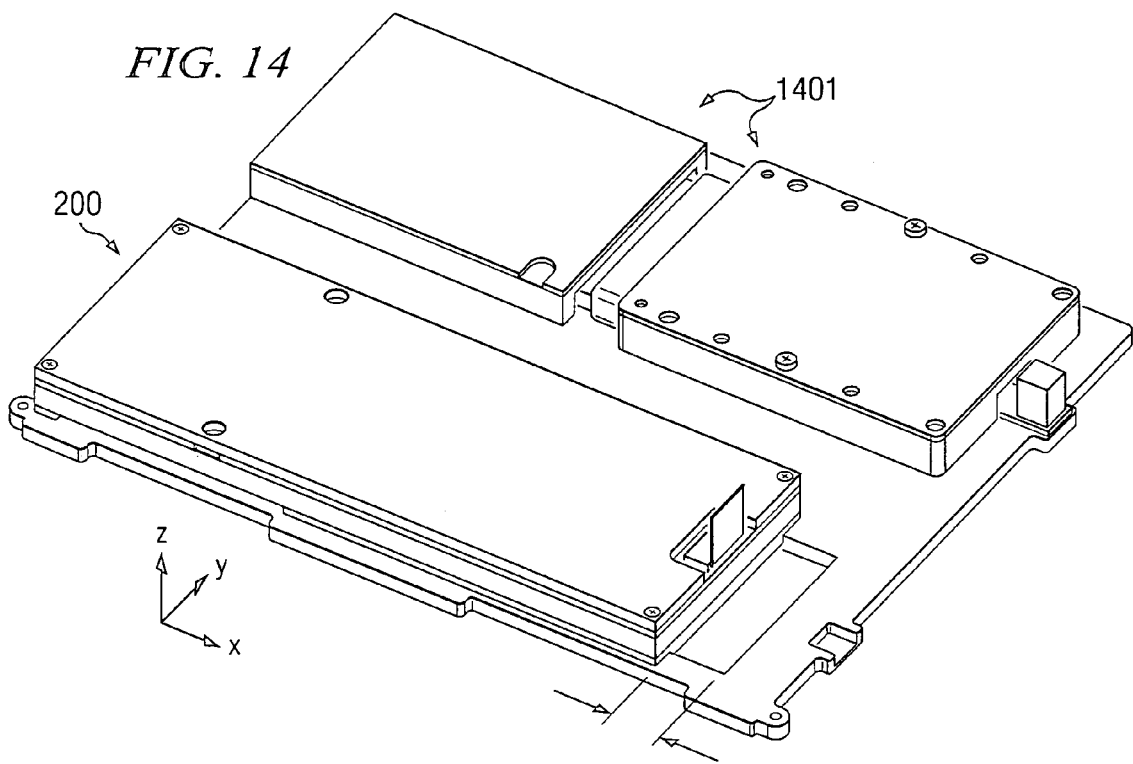

FIG. 14

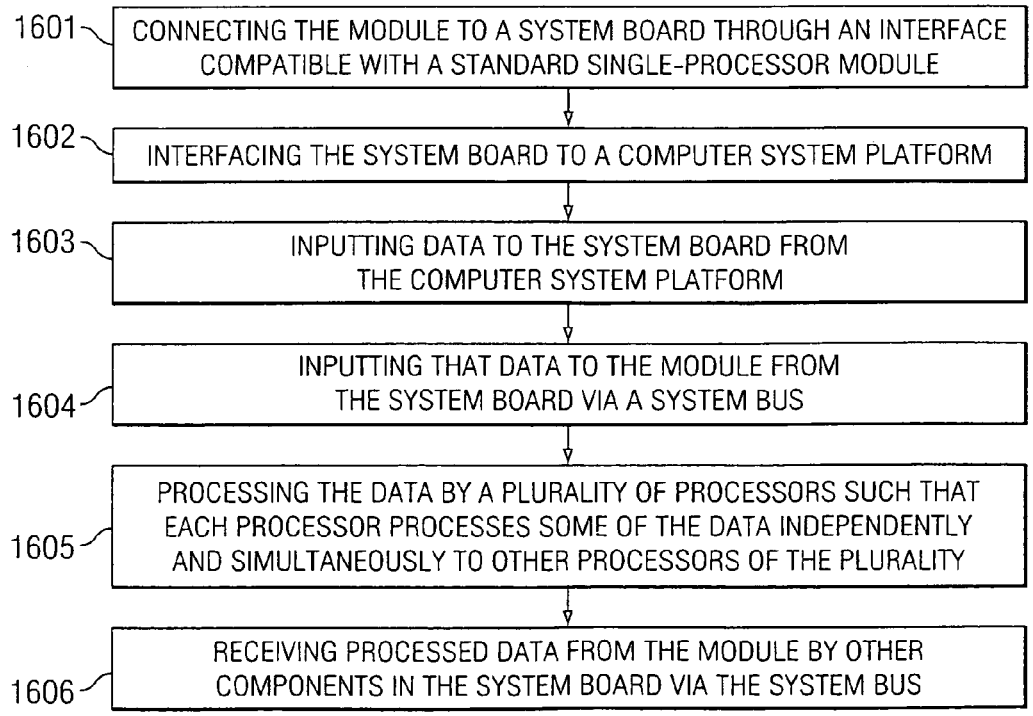

FIG. 16

1601 — CONNECTING THE MODULE TO A SYSTEM BOARD THROUGH AN INTERFACE COMPATIBLE WITH A STANDARD SINGLE-PROCESSOR MODULE

1602 — INTERFACING THE SYSTEM BOARD TO A COMPUTER SYSTEM PLATFORM

1603 — INPUTTING DATA TO THE SYSTEM BOARD FROM THE COMPUTER SYSTEM PLATFORM

1604 — INPUTTING THAT DATA TO THE MODULE FROM THE SYSTEM BOARD VIA A SYSTEM BUS

1605 — PROCESSING THE DATA BY A PLURALITY OF PROCESSORS SUCH THAT EACH PROCESSOR PROCESSES SOME OF THE DATA INDEPENDENTLY AND SIMULTANEOUSLY TO OTHER PROCESSORS OF THE PLURALITY

1606 — RECEIVING PROCESSED DATA FROM THE MODULE BY OTHER COMPONENTS IN THE SYSTEM BOARD VIA THE SYSTEM BUS

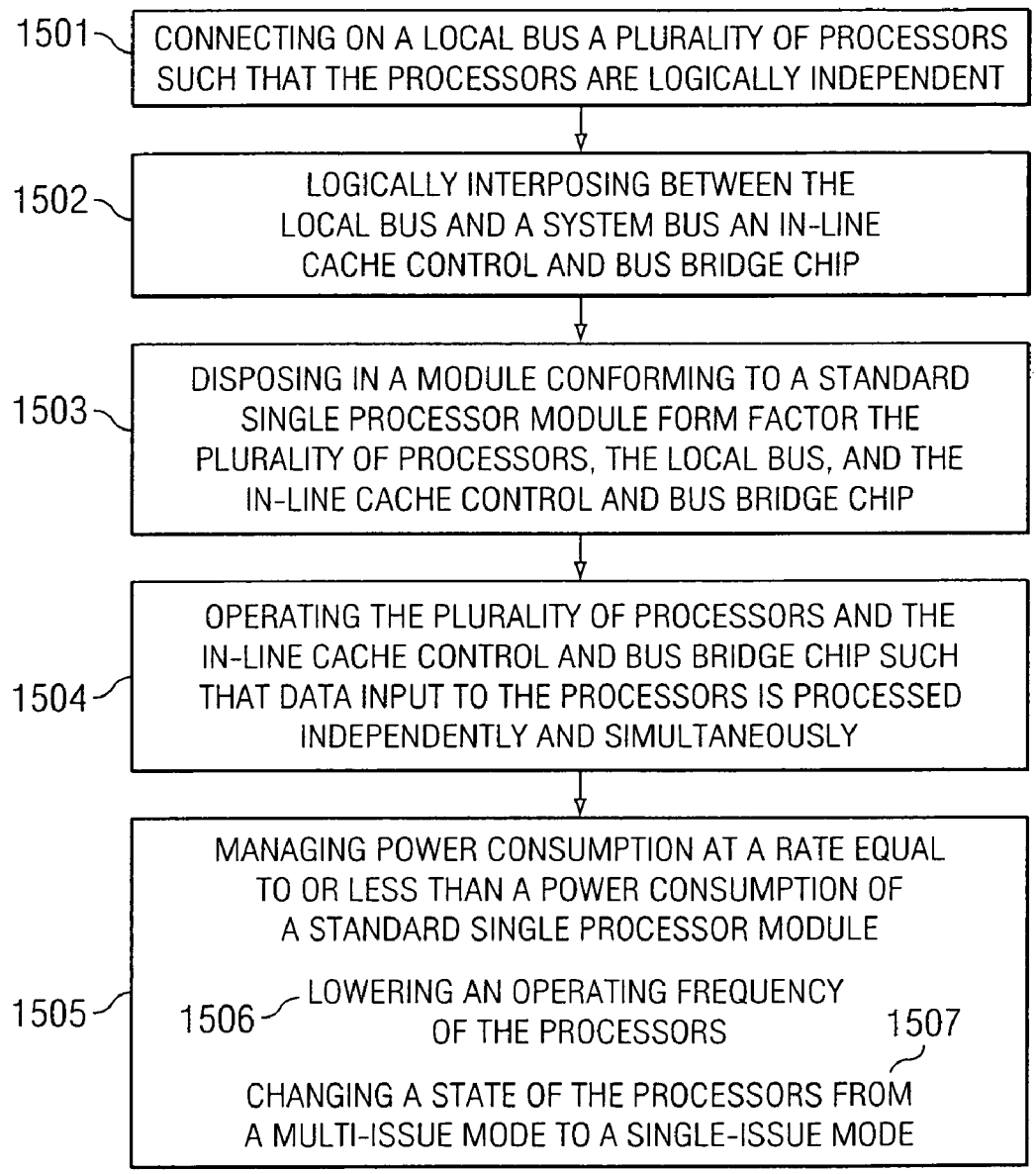

MULTI-PROCESSOR MODULE

CROSS-REFERENCE TO RELATED APPLICATIONS

This application claims priority to and commonly assigned U.S. Provisional Patent Application Ser. No. 60/455,605 entitled "DUAL-PROCESSOR MODULE," filed Mar. 17, 2003, the disclosure of which is hereby incorporated herein by reference.

BACKGROUND

The complexity, capacity, and intelligence of computer systems is ever evolving. Industry standards are often developed in an attempt to provide a degree of compatibility between computer systems and/or their functional components. For instance, various processor architectures are known in the art, such as the PA-RISC family of processors developed by HEWLETT-PACKARD Company ("HP"), INTEL Corporation's (INTEL) architecture (IA) processors (e.g., IA-32 and ITANIUM Processor Family processors), and the like. ITANIUM Processor Family (IPF) architecture is a 64-bit processor architecture co-developed by HP and INTEL, which is based on Explicitly Parallel Instruction Computing (EPIC). ITANIUM and its underlying architecture provide a foundation for software for various platforms, including without limitation the server and high-end workstation platforms.

In addition to supporting a 64-bit processor bus and a set of 28 registers, the 64-bit design of ITANIUM allows access to a very large memory (VLM) and exploits features in EPIC. Features of ITANIUM provide advances in the parallel processing handling of computer instructions known as predication and speculation. An additional ITANIUM feature includes a third-level cache memory, to supplement the current first- and second-level cache memories found in most of today's microcomputers. The ITANIUM family of processors includes such processors MERCED, MCKINLEY, and MADISON.

Microprocessors are often disposed in processor modules, wherein a processor module may include, among other things, a daughter card (or processor card) and a power card. The daughter card and power card may include printed circuit assemblies (PCA's), and may often be referred to as "boards." A daughter card includes one or more processor chips and related support circuitry, and a power card includes power converters and associated support circuitry.

Processor modules are often employed in large computer systems, such as servers. Traditionally, a server computer may include several system boards, which are used to process data. Each system board therein may include a plurality of processor modules and memory resources. The memory resources may include, but are not limited to, any kind of computer-readable data storage mechanism now known or later developed, such as random access memory (RAM), read only memory (ROM), and magnetic and/or optical data storage mechanisms. Various system boards may work together in supporting one or more applications running on the computer system. Therefore, if a server includes four system boards, and each system board includes four processor modules, and each processor module includes one processor, then that server includes sixteen processor modules and sixteen processors. Often, the number of processors in a server describes the "ways" of the server. For example, the sixteen-processor server referred to above may be called a "16-way server."

SUMMARY

According to at least one embodiment, an apparatus comprises a plurality of logically independent processors, a system bus, and a cache control and bus bridge device in communication with the plurality of processors such that the cache control and bus bridge device is logically interposed between the processors and the system bus, and wherein the processors and cache control and bus bridge device are disposed in a module form factor such that the apparatus is a drop-in replacement for a standard single-processor module.

BRIEF DESCRIPTION OF THE DRAWINGS

FIG. 2B is an illustration of a traditional bus-based design;

FIG. 2C is an illustration of an exemplary processor module in communication with a system bus adapted according to certain embodiments;

FIG. 3 is an illustration of an example computer system implementing a plurality of multi-processor modules adapted according to certain embodiments;

FIG. 14 is an illustration of an exemplary design of a module adapted according to certain embodiments placed next to a traditional, standard INTEL MADISON single-processor module;

FIG. 15 depicts an exemplary operational flow for operation of a plurality of processors according to at least one embodiment;

FIG. 16 depicts an exemplary operational flow for operations of block 1504 of FIG. 15.

DETAILED DESCRIPTION

Figure 1:
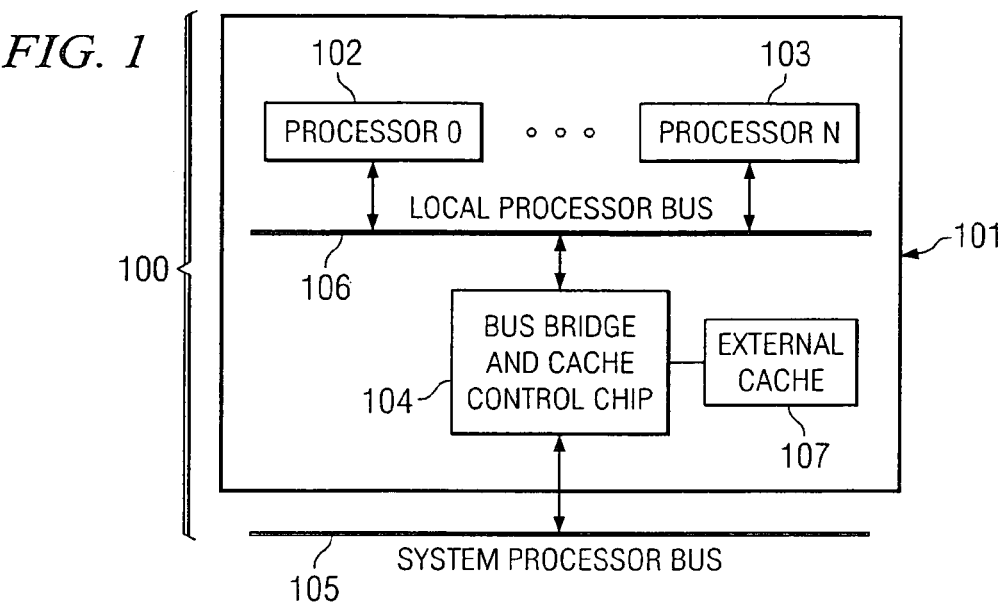
FIG. 1 is an illustration of an exemplary dual-processor apparatus adapted according to certain embodiments.

FIG. 1 depicts an exemplary multi-processor apparatus 100 adapted according to certain embodiments. In this example, apparatus 100 includes processors 102 and 103 (such that it may be referred to also as a "dual-processor" apparatus), cache control and bus bridge chip 104, local processor bus 106, external cache 107, and module form factor 101. Module form factor 101, in this embodiment, is approximately a shape and size of a standard single-processor module, even though it contains two processors. Module form factor 101 is not a module itself, but rather, "form factor" is a conceptual term used to describe the size and shape of a module. Processors 102 and 103 are each independently coupled on local bus 106 and are in communication with each other and in communication with cache control and bus bridge chip 104. Cache control and bus bridge chip 104 is logically interposed between local bus 106 (on which is located processors 102 and 103) and system bus 105. Cache control and bus bridge chip 104 also provides processors 102 and 103 with access to external cache 107. Processors 102 and 103 of apparatus 100 communicate with other components of a system board (such as memory devices) via cache control an d us bridge chip 104 and system bus 105.

Apparatus 100 is a drop-in replacement for a single-processor module, which means that apparatus 100 may interface with a socket that is compliant/compatible with a single-processor module, with no modifications to the socket needed. Further, such a drop-in replacement apparatus communicates with the other components on the computer system via system bus 105 just as a single processor module would communicate with the system via system bus 105 if the system firmware is updated to facilitate communication with cache control and bus bridge chip 104. Thus, the number of processors in a system may be increased in a manner that is transparent to the computer system hardware (i.e. without requiring changes to the processor module interface). Apparatus 100 may contain other components in addition to processors 102, 103, cache control and bus bridge chip 104, and cache 107. However, in this example, the above-mentioned components will be the focus. Further, other embodiments may or may not employ external cache 107, depending on such factors as adequacy of on-chip cache.

A processor module with more than one processor may be called a "multi-core processor" or "multi-processor" module. It is possible to implement multi-core processor modules in computer systems, wherein a multi-core processor module may employ an apparatus, such as apparatus 100. For instance, dual-core processor modules may be implemented in servers. Such dual-core processor modules may provide several advantages. For instance, an 8-way server, a 16-way server, and a 64-way server may be migrated to 16-way, 32-way and 128-way servers, respectively, by implementing dual-core processor modules in the place of single-core processor modules. Such embodiments may provide a significant boost in transaction processing, which may be measured in various ways, including transactions per minute ("tpmC").

Figure 2A:
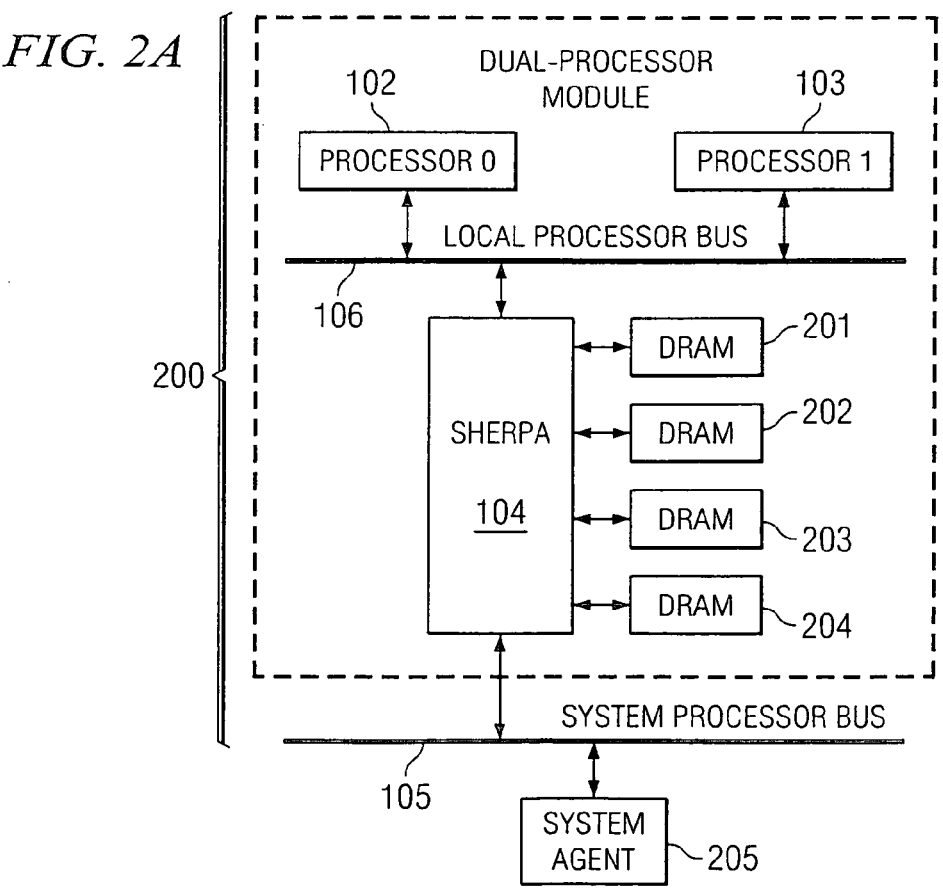
FIG. 2A is an illustration of an exemplary multi-processor module in communication with a system bus adapted according to certain embodiments.

FIG. 2A illustrates an exemplary system adapted according to certain embodiments of a multi-processor module. In the embodiment depicted in FIG. 2A, multi-processor module 200 is in communication with system bus 105. Specifically, multi-processor module 200 is a dual-core module, which includes, among other things, processors 102 and 103. Multi-processor module 200 further includes front-side bus interface 104 (which in this example is an application-specific integrated circuit ("ASIC") cache control and bus bridge chip, such as cache control and bus bridge chip 104 of FIG. 1 referred to in this example as "Sherpa"), four double data rate ("DDR") dynamic random access memories ("DRAMs") 201-204 acting as a fourth level external cache, local bus 106, and power converters and other assorted support components (not shown). Sherpa 104 enables multi-processor module 200 to be compatible with a single-core module socket (not shown) and system front-side Bus 105 ("FSB") as well as to accommodate local bus 106 for processors 102 and 103. In this manner, a computer, such as a server, having a socket adapted to receive a standard single-core module may be readily upgraded by replacing its single-core module with a multi-processor module, such as the dual-core module 200 of FIG. 2A. In addition, Sherpa 104, in this example, provides the fourth-level cache interface to DRAMs 201-204.

Sherpa 104, in this example, is a cache-controller and bus-bridge chip for processors (such as processors 102 and 103) that reside on a system bus (such as FSB 105). As in the example of FIG. 2A, some specific applications Sherpa 104 may be used with IPF CPUs to provide performance and meet scaling requirements for high-end IPF computer systems.

Sherpa 104 may be called an "in-line" cache control and bus bridge chip because it logically resides between a processor and a system agent, such as system agent 205 located on a system bus, such as FSB 105. Agent chips, such as system agent 205 may be part of an interface chipset, such as HP's zx1 or SX1000 or Intel's 8870, that provides access from processors to the rest of a computer system's resources (Memory, Boot Flash, I/O, etc.). From the perspective of processors 102 and 103, Sherpa 104 acts as a central memory agent on local FSB 106, whereas from the perspective of system agent 205, Sherpa 104 acts as if it is a processor (or symmetric agent) on system FSB 105. Sherpa 104 has two major value propositions, in this embodiment: 1) it facilitates a large, fourth level off-chip cache interface for processors (such as processors 102 and 103), and it allows for adding multiple processors to a system without presenting additional bus loads to a system agent. In a computer system, adding more components on a system bus may slow down bus speed. Also, placing a local bus between processors and a system bus may increase latency. Sherpa 104 allows multiple processors to appear as one bus load on a system bus while resulting in little more latency than a single processor placed directly on a system bus. Further, just as it is possible to implement more than one processor as a single bus load on a system bus utilizing a Sherpa, it is also possible to implement more than one processor as a single bus load on a local bus by utilizing a Sherpa, thereby creating nested Sherpa/processor bus loads. The limit of possible nested layers is constrained by, among other things, latency, which increases with each nested layer.

FIG. 2B is an illustration of a traditional single-processor bus-based design. FIG. 2C is an illustration of an exemplary processor module in communication with a system bus and employing a cache controller, adapted according to certain embodiments. Taken together, FIGS. 2B and 2C compare a traditional bus-based design (FIG. 2B) to one employing a cache control and bus bridge chip to provide an interface between a processor and a system agent on a system bus. In FIG. 2C, Sherpa 104 resides between processor 102 and the connection of processor 102 to system agent 205. The traditional bus-based system of FIG. 2B includes processor 102 and system agent 205 accessible via system FSB 105. The system depicted in FIG. 2C also includes processor 102 and system agent 205; however, Sherpa 104 logically resides between processor 102 and system agent 205. From the perspective of processor 102, Sherpa 104 acts as system agent 205 (or a central agent on the local FSB 201), whereas from the perspective of system agent 205, Sherpa 104 acts as if it were symmetric agent processor 102 on system FSB 105.

Accordingly, in the example of FIG. 2C, system agent 205 acts as if it is connected to processor 102, and processor 102 acts as if it is connected to system agent 205. However, cache control and bus bridge chip 104 is logically interposed transparently between them. In these embodiments Sherpa 104 electrically isolates system bus 105 from local processor bus 106, and gives system bus 105 the capability to support more processors without suffering electrical signal degradation that may occur from simply adding more processors directly on a system processor bus. In addition, Sherpa 104 in this embodiment also provides logic necessary to route specific processor requests from system agent 205 to the correctly targeted processor when more than one processor is placed on local bus 201. Fourth level cache implemented as DRAMs 201-204 in this embodiment improves the performance capability of module 200 (as in FIG. 2A). Because of this design, Sherpa 104 allows construction of a processor module that contains multiple processors where the traditional (non-Sherpa) design of the system of FIG. 2B permits only one processor per module.

A specific application of the system of FIG. 2A may be implemented as follows. As shown, example processor module 200 includes two processors 102 and 103. Module 200 further includes Sherpa cache control and bus bridge chip 104 communicatively coupled to processors 102 and 103 via local FSB 106. As further shown, a fourth level cache in the form of DRAMs 201-204 is also provided. Sherpa cache control and bus bridge chip 104 is also communicatively coupled to system FSB (memory bus) 105. Thus, a fourth level cache is shared by processors 102 and 103. Further, module 200 may be connected to a socket (not shown) on system FSB 105. Thus, two processors 102 and 103 may be implemented at each socket of a system board, as opposed to only one processor at each socket of a system board in traditional designs, such as that illustrated in FIG. 2B. Thus, module 200 is compatible with a single-processor interface such that multiple processors included in such module 200 may be implemented transparently.

Turning to FIG. 3, an exemplary computer system implementing a plurality of multi-processor modules according to certain embodiments is shown. Example system 300 includes a plurality of modules 200 of FIG. 2A. More specifically, multi-processor modules 200A-200H are implemented in system 300, wherein each module 200A-200H corresponds to the module 200 of FIG. 2. Accordingly, each of the modules 200A-200H includes two processors (such as 102 and 103 of FIG. 2A), a Sherpa (such as cache control and bus bridge chip 104), and fourth level cache. In alternate embodiments, each module 200A-200H may include one or more than two processors. Each of the modules 200A-200D is communicatively coupled to a single-processor module interface or socket (not shown) on a first system FSB 105A to enable access to system agent 301A, which is a interface for components on FSB 105A to system resources, such as memory devices, I/O devices, system fabric, boot flash, and other devices, and each of the modules 200E-200H is communicatively coupled to a single-processor module interface or socket (not shown) on a second system FSB 105B to enable access to agent 301B.

Hardware elements 301A and 301B represent subsystems that provide main memory (RAM) that is situated "proximally" to the processors (modules 200A-200H) communicatively coupled by buses 105A and 105B. For example, these subsystems may, in certain implementations, be included on a common system board of a multi-system board computer with their corresponding processor modules. In this example, system board 303 includes modules 200A-200H coupled to bus 105A and agent 301A. The memory in such a system typically provides a lower latency of access as seen by the processors proximal to it than by processors more distal. Similarly, as mentioned above, elements 301A and 301B provide connections to system resources, such as memory, I/O controllers, and peripherals (not shown). Though the specific embodiment of computer system 300 implements a symmetric address space model in which each device in the system is accessible by direct access from any processor in the system, the latencies of these accesses may vary. Such system is typically said to exhibit Non-Uniform Memory Access (NUMA) characteristics. Such systems are typically more scalable to larger numbers of hardware elements, which is the reason the latency disadvantage is acceptable. System crossbar element 302 represents a communication network that passes the load/store transactions maintaining full semantics, such as coherency. For instance, system crossbar 302 may interconnect various system boards of a multi-system board computer system (e.g., may interconnect different cabinets of system boards). As illustrated in this embodiment, system boards 303 and 304 are connected to system crossbar 302. Typical embodiments in similar systems may utilize non-blocking crossbar technology or torroidal or mesh networks.

It should be recognized that by implementing modules 200A-200H, system 300 of FIG. 3 contains 16 processors instead of the maximum of 8 processors that would be achieved if standard single-processor (single-core) modules were implemented. That is, implementing modules 200A-200H doubles the number of processors that would otherwise be achieved in system 300 if standard single-processor modules were implemented at each location at which modules 200A-200H are implemented in system 300. Further, this increase is achieved without requiring any changes to the remainder of system 300 as each multi-processor module is compatible with single-processor module interfaces, as long as the system firmware is a version that facilitates communication with a cache control and bus bridge chip. In this embodiment, the Sherpa chip (such as Sherpa 104) contains the logical resources to "bridge" a system processor bus (such as FSB 105A and 105B) over to an electrically isolated local processor bus (such as bus 106 of FIG. 2A) so that a system's processing resources may be multiplied. The architecture of system processor busses usually limits the number of processors that can be addressed from a single agent chip (such as agent 205 in FIG. 2A), but a Sherpa chip may allow the number of processors to be increased above the addressing limitations of the architecture by providing necessary logic to direct traffic from a system agent to each processor located on a Sherpa's local processor bus. To prevent the increased traffic load from the additional processors facilitated by a Sherpa from creating a performance bottleneck on a system processor bus, a Sherpa may also use a direct memory interface to provide a large fourth-level cache (implemented in FIG. 2A as DRAMs 201-204) to improve the cache "hit" potential. Data requests from processors are received by a Sherpa, which will either handle the request directly if the desired data is present in the cache (thereby preventing unnecessary system processor bus loading), or will direct the request through to the system agent when necessary. Sherpa's interposition between a system agent and processors also provides necessary electrical isolation so that signal integrity of a system processor bus is not compromised.

Certain embodiments may be implemented as drop-in replacements for some traditional single-processor modules. Therefore, innovative packaging and power techniques may be used in embodiments of dual-processor module 200, such as those discussed further herein.

Figure 4A:
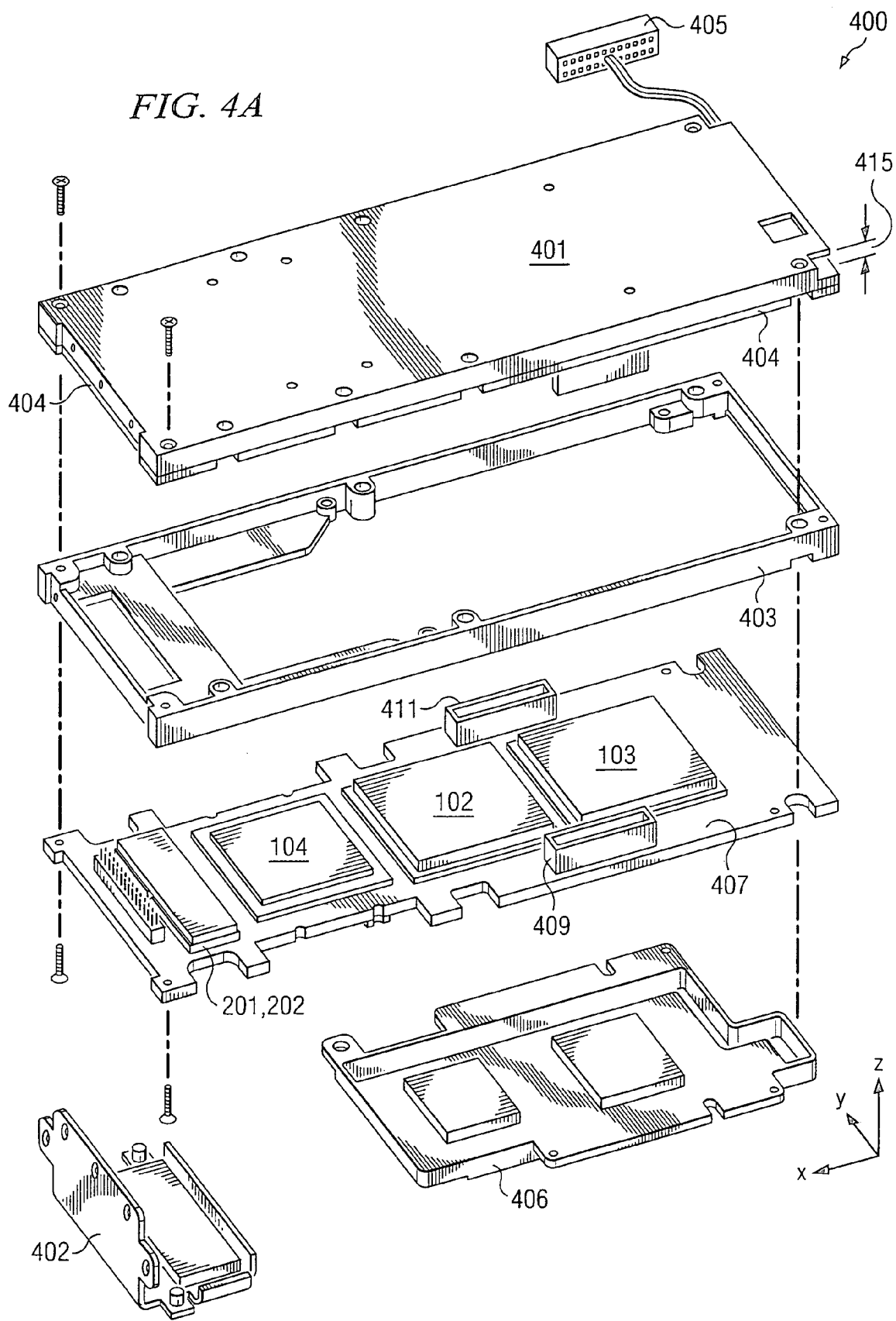
FIGS. 4A and 4B are exploded views of one implementation of a multi-processor module adapted according to certain embodiments.
Figure 4B:
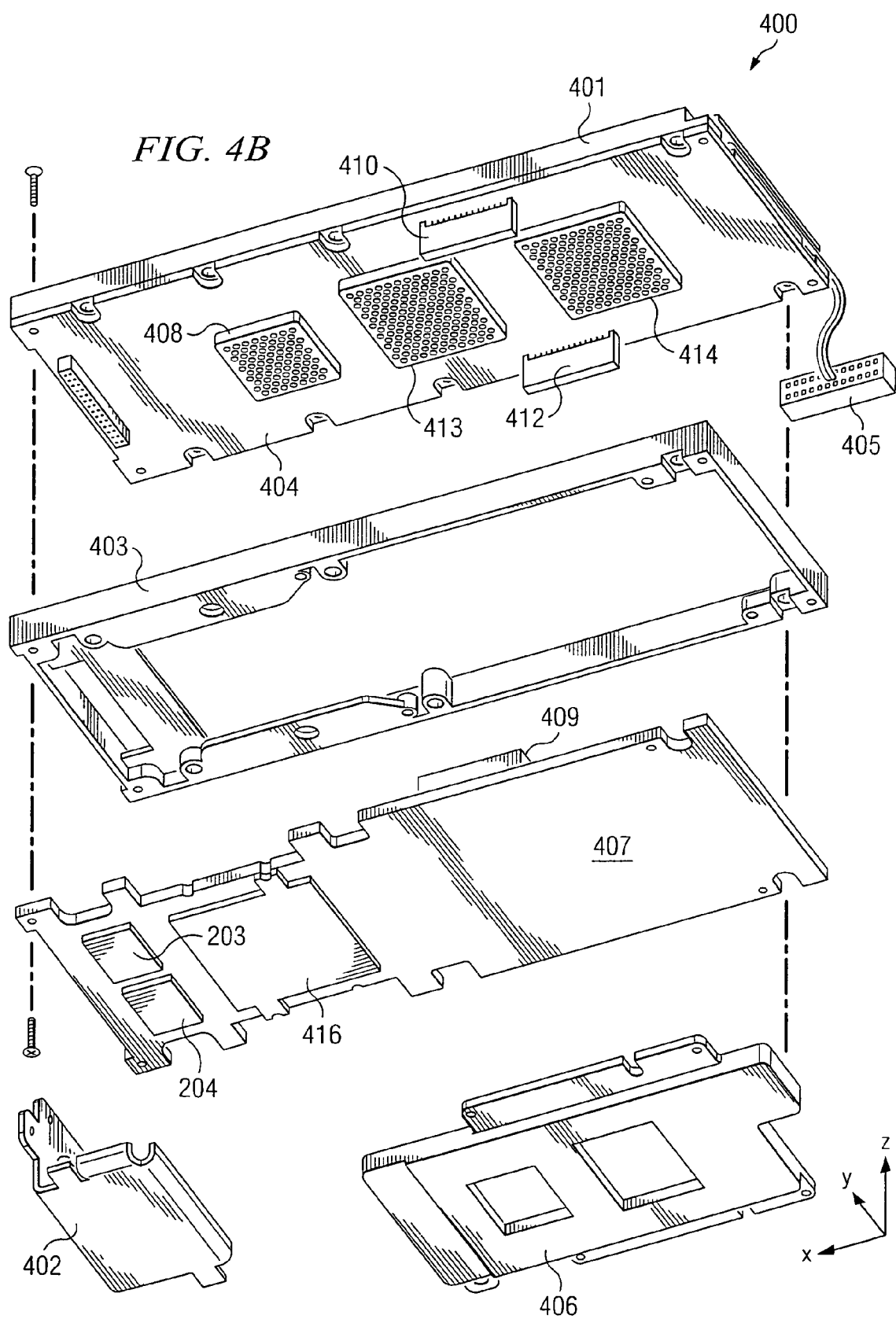

FIGS. 4A and 4B show exploded views of one implementation of dual-processor module 400, wherein FIG. 4A is a view of module 400 from above, and FIG. 4B is a view from below. The overall dimensions of the example module as shown in FIGS. 4A and 4B is 194 mm long (in the X-axis), 71 mm wide (in the Y-axis), and just under 22 mm high (in the Z-axis). Other embodiments may employ different dimensions, and various shapes and sizes of dual processor module 400 are within the scope of embodiments. In this particular example, processor board 407 of module 400 includes, among other things: processors 102 and 103 (which in this example are IPF MADISON processors), Sherpa 104 (which in this example is an ASIC), and DRAMs 201-204. Power board 404 includes a 48VDC power converter (not shown), and power management electronics (not shown). Further, heat spreader 401 includes channel 415, which runs the length of a side (a side defined by the Y and Z-axes) of heat spreader 401 and can accommodate flexible power cord 405 such that much of the length of power cord 405 may be run internally of the volume of module 400. Channel 415 and power cord 405 provide flexible and internal power cable routing. While power cord 405 is shown routed from module 400 to outside of the volume of module 400 in one Y-axis direction, power cord 405 may be routed in channel 415 in the other Y-axis direction. Processor board 407, power board 404, heat spreader 401, cooling strap 402, frame 403, power cord 405, and bolster plate 406 all fit within the area and volume of module 400.

In example module 400 of FIGS. 4A and 4B, heat spreader 401 is piggybacked over power board 404, and power board 404 is piggy-backed over processor board 407. In a piggy-backing arrangement, one or more boards or heat spreading layers are positioned in parallel planes with one board or layer positioned directly over another board or layer. For example, if two boards are each PCAs, the areas of which are defined in X-Y planes, the boards are piggybacked by arranging them such that one board is placed over the other in the Z-axis. Piggybacked boards and layers may save X-Y axis space in a module and allow that module to keep a smaller X-Y axis footprint by utilizing Z-axis space. FIGS. 4A and 4B depict multiple ITANIUM Processor Family (IPF) packaged processors 102 and 103 in power board 404 with piggyback power board 404 and piggybacked heat spreader 401, all within module 400.

Figure 5:
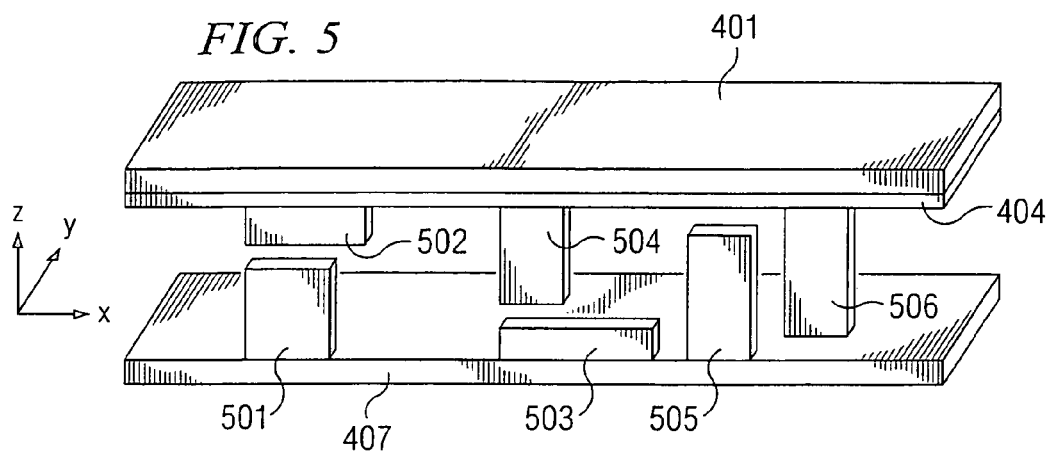
FIG. 5 is an illustration of an example system implementing a complementary skyline design.

In example module 400 of FIGS. 4A and 4B, power board 404 and processor board 407 employ a complementary skyline and interleaved component design to facilitate the piggyback power arrangement. FIG. 5 is an illustration of an example system implementing a complementary skyline and interleaved component design. Power board 404 hosts example components 502, 504, and 506 and processor board 407 hosts example components 501, 503, and 505. Because power board 404 is piggybacked onto processor board 407, the components of each board 404 or 407 need to accommodate the components of the other board 404 or 407, respectively. Such accommodation may be accomplished by designing boards 404 and 407 such that a tall component on one board is complemented by a correspondingly short component on the other board and that some of the tallest components on one board are complemented by only the smallest of components on the other board. Accordingly, example components 501 and 502 accommodate each other with regard to Z-axis space such that there is room for both components 501 and 502 to fit in module 400 without touching each other. Example components 503 and 504 accommodate each other in a similar manner. Tall components 505 and 506 may be considered to be interleaved with respect to each other since one must come after the other along the X-axis. Components 505 and 506 are complemented in the Z-axis by the smallest of components (not shown), such as resistors and inductors. Such accommodation may be referred to as a "complementary skyline and interleaved component" design.

Returning to FIGS. 4A and 4B, power board 404 includes a unique, high-density power converter with three large holes to accommodate cooling pedestals (such as variable gap thermal interfaces 408, 413, and 414) that poke through power board 404 contacting, and thereby cooling, Sherpa 104 and processors 102 and 103. FIGS. 4A and 4B show the location of the pedestals of variable gap thermal interfaces (VGTIs) 408, 413, and 414 in at least one implementation.

Figure 6:
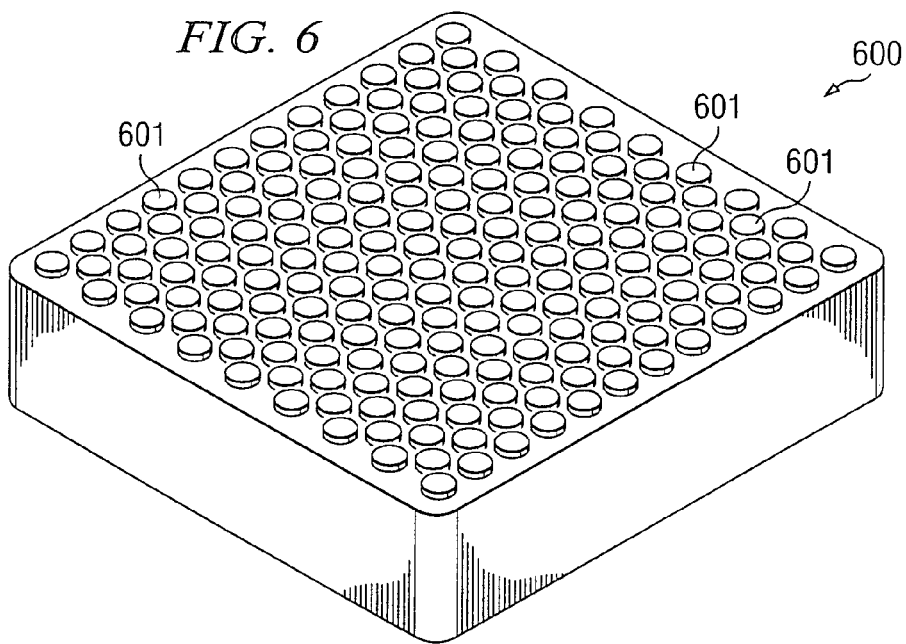
FIG. 6 is an illustration of an exemplary implementation of a variable gap thermal interface device adapted according to certain embodiments.
Figure 7:
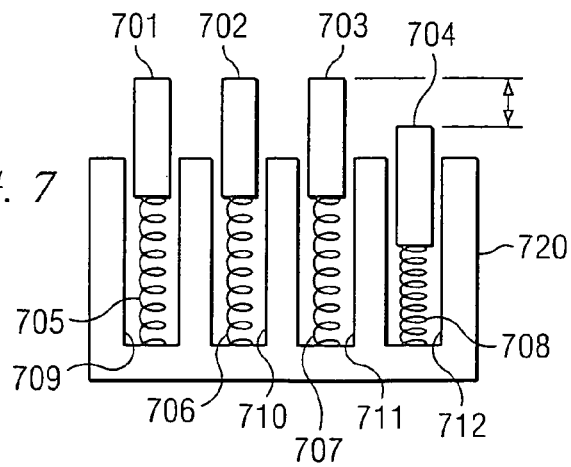
FIG. 7 is an illustration of an exemplary implementation of a variable gap thermal interface device adapted according to certain embodiments.

In the example embodiments depicted in FIGS. 4A and 4B, VGTIs 408, 413, and 414 accommodate assembly tolerances of 60 mils. Assembly tolerances may vary from embodiment to embodiment, and similar VGTIs are within the scope of those embodiments. Traditional, commercially available state-of-the-art thermal gap fillers capable of absorbing 60 mils tolerances often have a thermal resistances of 2.0° C./W, which may result in 100° C. rise from the surface of heat spreader 401 to a processor 102 or 103. VGTIs 408, 413, and 414 in this example embodiment provide an order of magnitude better thermal performance (0.2° C./W or a 10° C. rise). FIG. 6 is an illustration of an exemplary implementation of a VGTI device adapted according to certain embodiments. The example VGTI 600 of FIG. 6 is a 1-inch square implementation similar to VGTIs 408, 413, and 414. VGTI 600 includes a plurality of aluminum pins (such as pin 601) protruding from the surface of VGTI 600. FIG. 7 is an illustration of an exemplary implementation of a VGTI device adapted according to certain embodiments. FIG. 7 illustrates VGTI 700, which is made up of an array of aluminum pins 701-704 (similar to pin 601) with springs 705-708 in cylinders 709-712 imbedded in pedestal 720. Pins 701-704 have a range of movement, which allows for adaptation to a variety of assembly tolerances.

In FIGS. 4A and 4B, a Z-axis DC interconnect includes slot-and-blade contacts 409-412, wherein contacts 409 and 411 are slots, and contacts 410 and 412 are blades. The DC interconnect provides power from power board 404 to processor board 407. Contacts 409-412 provide such advantages as Z-axis tolerance and a low resistance, low inductance connection that minimizes the foot print and maintains a low Z-axis height (in the current example embodiments, 7 mm). Low inductance may lead to low power rail noise associated with transient currents, reduction in decoupling capacitance, and increase in reliability of module 400. In at least one implementation, contacts 409-412 mate the two parallel boards 404 and 407 in a mezzanine fashion that provides the above advantages. To minimize inductance, output capacitors (not shown) are located on processor board 407 instead of on power board 404.

Figure 8:
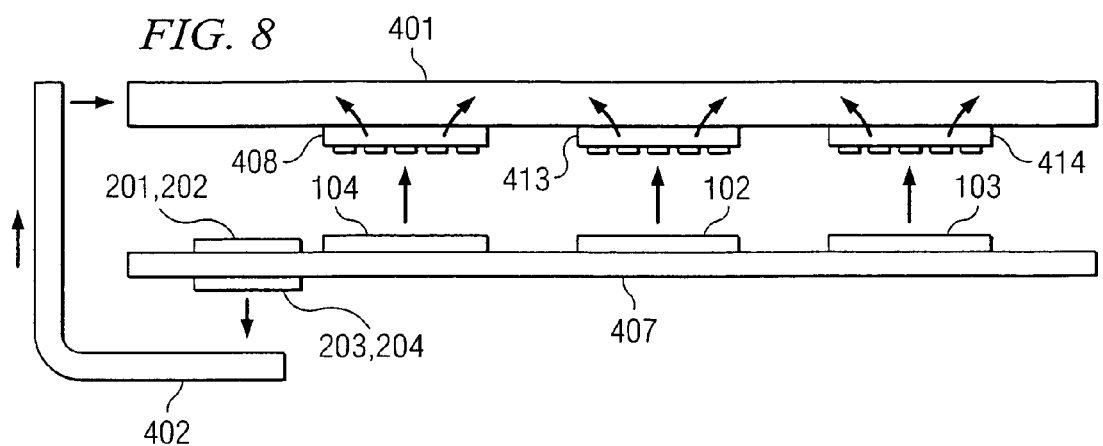
FIG. 8 is an illustration of exemplary cooling paths in an example implementation of a module adapted according to certain embodiments.

FIGS. 4A, 4B, and 8 illustrate cooling strap 402, which allows for the placement of power consuming devices on the surface of processor board 407 which is remote from heat spreader 401. In these example embodiments, DRAMs 203 and 204 are located on the side of processor board 407 that is remote from heat spreader 401. DRAMs 201 and 202 are mirrored directly on the other side of DRAMs 203 and 204 such that DRAMs 201 and 203 are back-to-back and DRAMs 202 and 204 are back-to-back. In the example embodiments of FIGS. 4A and 4B, cooling strap 402 employs copper; however, other thermally-conductive materials are within the scope of embodiments. Because DRAMs 201-204 produce much less heat than processors 102 and 103, thermal constraints in placement are less, such that DRAMs 201-204 may be placed back-to-back and employ a cooling strap instead of directly contacting heat spreader 401 or having to utilize a more sophisticated means for heat dissipation. Further, in the example embodiments, cooling strap 402 has a 90 degree bend and a compliant gap pad, which allows strap 402 to interface with two surfaces that are non-coplanar (in this case, the surfaces of DRAMs 203 and 204 and the side of heat spreader 401), allowing a common thermal path to heat spreader 401 for multiple devices, thereby providing a common interface thermal solution. A common interface thermal solution may be considered to be a thermal dissipation system in which all or nearly all of the components in a device utilize a common heat dissipation structure, such as in this embodiment wherein nearly every component utilizes heat spreader 401 to dissipate heat. The compliant gap pad (not shown) is a piece of heat conducting material sandwiched between the surfaces of DRAMs 203 and 204 and the corresponding surface of cooling strap 402 to ensure contact between those surfaces. Examples of appropriate materials for the gap pad are T-PUTTY 502, manufactured by THERMAGON, and thermal grease, available from a variety of vendors. Thus, in the example embodiments of FIGS. 4A and 4B, cooling strap 402 provides a thermal path from DRAMs 201-204 to heat spreader 401. Processors 102 and 103 and Sherpa 104 all dissipate heat to heat spreader 401 through VGTIs 408, 413, and 414. Also, power board 404 dissipates heat through contacting directly heat spreader 401. Further, many embodiments will employ additional heat sink devices (not shown) coupled to heat spreader 401 to better dissipate heat from module 400. FIG. 8 is an illustration of exemplary cooling paths in an example implementation of a module adapted according to certain embodiments. FIG. 8 shows various cooling paths as arrows.

The power limit (or maximum allowed power consumption) for the embodiments depicted in FIGS. 4A and 4B is 170 W, which matches the power limit of a reference single-processor INTEL MADISON/Power Pod design. Thus, in the embodiments depicted in FIGS. 4A and 4B, module 400 doubles the processor count of the reference single-processor INTEL MADISON/Power Pod design, as well as adds fourth level external cache and an ASIC Sherpa 104, while still using the same amount of power, and while providing more performance. Such performance may be measured by any of a number of benchmarks, such as transactions per minute (or tpmC). Maintaining the power limit of a reference single-processor module allows module 400 to function as a drop-in replacement for the reference single-processor module so that few (if any) power modifications would need to be made to a computer system employing module 400. Appropriate power limits may depend on an available power supply and often depend on a power supply employed in an existing computer system. Other appropriate power limits are possible with module 400 and are within the scope of embodiments.

Figure 9A:
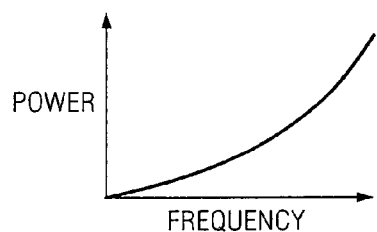
FIGS. 9A-9C depict power, frequency, and performance curves for typical processors used in computer systems.
Figure 9B:
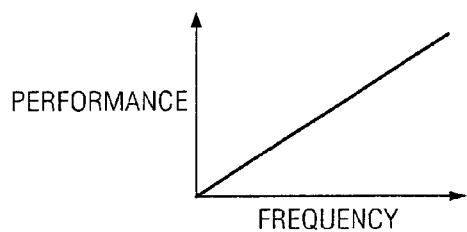
Figure 9C:
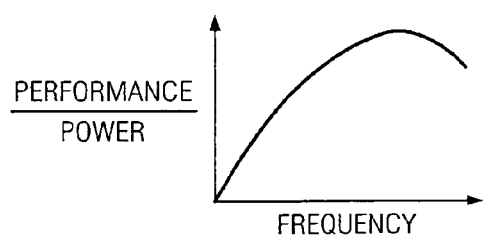

In the embodiments depicted in FIGS. 4A and 4B, processors 102 and 103 include one MADISON processor each, and the operating frequency of MADISON processors 102 and 103 is lowered from 1.5 GHz to 1.1 GHz. In these embodiments, such a frequency drop allows a power drop from approximately 130 W to 68 W per MADISON processor 102 and 103. An additional 13 W of power savings per processor is saved in these embodiments by using a Power Limiting Architecture functionality, which is described below. Even at the lower operating frequency, the performance of processors 102 and 103 with fourth level external cache in the embodiments depicted in FIGS. 4A and 4B is substantially better than performance of a reference single-processor INTEL MADISON/Power Pod design for the same amount of power. FIGS. 9A-9C depict power, frequency, and performance curves for typical processors used in computer systems. FIG. 9A illustrates that increased frequency typically requires increased power consumption of a processor; further, the increase in power consumption typically outpaces the increase in frequency. FIG. 9B illustrates that typically a processor will provide increased performance as its operating frequency is increased, and that operating frequency and performance usually have a linear relationship. FIG. 9C illustrates unit performance divided by unit power typically increases as frequency increases, but levels off, and eventually decreases as frequency approaches a maximum specified frequency. The curve of FIG. 9C illustrates that for power consumption purposes, a processor operating at a frequency corresponding to the top of the curve will experience higher efficiency while still maintaining moderate performance parameters. In the embodiments depicted in FIGS. 4A and 4B, frequency was decreased on each processor, while two processors were provided, such that performance of the two processors together usually equals 150% to 200% of performance for a standard single-processor module while power consumption remains at the level for a standard single-processor module. Such embodiment experiences increased efficiency, as performance per watt is kept at or near a maximum. Other embodiments that are not constrained by such power limits may provide performance at 200%-400% of that of a standard single-processor module. Further, other embodiments may employ any operating frequency that may be appropriate for an application in which module 400 is included. Such appropriate operating frequency may be dictated by power limits or operating characteristics of a larger, existing computer system in which module 400 may be employed.

In order to operate each processor 102 and 103 at 1.1 GHz and 55 W each in these embodiments depicted in FIGS. 4A and 4B, Power Limiting Architecture was implemented to stay within the 170 W power limit. Using this technique, the power system was designed to operate at nominal conditions with excursions to extremes that limited or clipped power consumption. This functionality is referred to as "Power Limiting." Power Limiting Architecture (PLA) is used to monitor and control output power, input power, and thermal conditions. In embodiments which employ PLA, when system extremes (such as chip temperature or power consumption) are exceeded by worst-case abnormal code, the performance is throttled down by changing a state of a processor (such as processor 102 or 103 or both) from multi-issue mode to single-issue mode until the worst-case scenario passes, thereby lowering power consumption and chip temperature during the processing of such abnormal code. PLA may ensure that the temperature and power of processors 102 and 103 stay within budgeted operating parameters.

In the embodiments depicted in FIGS. 4A and 4B, power and temperature values are compared by PLA against reference power and temperature values. When operating conditions result in total power consumption which exceeds a reference power value, a single issue command will be sent to the processor (102 or 103) which has the highest power consumption. The result is to bring the overall power consumption of module 400 below the power limit. If the power consumption level does not fall below the power limit, then the other processor (102 or 103) can be sent a single issue command. If the total power consumption of module 400 still does not fall below the power limit the PLA can provide information to a system level application alerting the computer system of an extreme power condition. In these embodiments, a similar algorithm is applied to temperature variables and to individual processor power consumption.

Certain embodiments of module 400 employ a standard CPU interface, which requires a temperature monitoring device that uses System Management Bus (SMBus) protocol. In this example embodiment, power board 404 needs to know the temperatures of processors 102 and 103. Power board 404 uses a secondary SMBus interface (serial bus interface) on processor board 407 to obtain each processor's (102 and 103) temperature. The use of a secondary SMBus allows a primary SMBus interface on power board 404 to provide system interface to registers within a power board memory space while continuously providing temperature information to a power control algorithm without being burdened by the actual temperature-obtaining algorithm. Such a scheme prevents system accesses on a primary SMBus from interfering with the power control algorithm while still allowing the primary SMBus to provide other kinds of information to a system interface.

In the embodiments depicted in FIGS. 4A and 4B, power board 404 employs a fixed duty cycle 48V front-end converter (not shown) in communication with an intermediate power bus (also not shown) to maximize efficiency. The conversion process is a two-stage DC-DC conversion process that results in a higher efficiency that a single-stage DC-DC conversion. A 48-volt input is first dropped down via a DC-DC converter to an intermediate voltage, and then the intermediate voltage is passed through a second DC-DC conversion stage to step down to operating voltages used by the devices in the multi-processor module. The two-stage conversion process in this embodiment provides more efficiency than a traditional single-stage process because the large voltage disparity between the 48-volt input and the operating voltages used by processor cores makes a single-stage conversion process less efficient. This provides, in these embodiments, approximately a 3% improvement in efficiency, thus allowing more power to be allocated to processors 102 and 103. Other embodiments may employ other appropriate power converters, as dictated by the characteristics of the module, an existing system, or a power supply.

Figure 10:
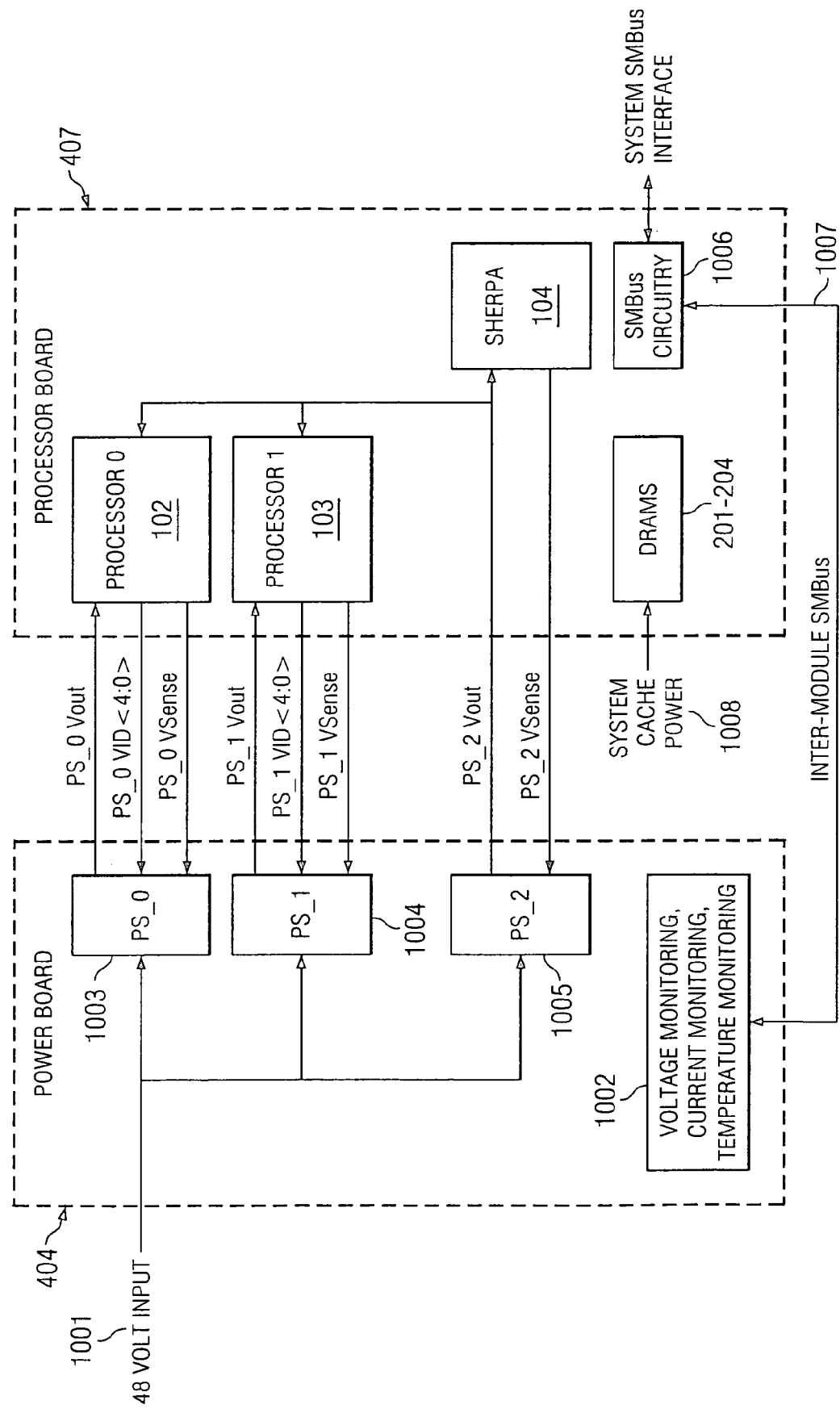
FIG. 10 is a schematic diagram of exemplary power connections internal and external to an example module according to certain embodiments.

FIG. 10 is a schematic diagram of exemplary power connections internal and external to module 400 according to certain embodiments. Power board 404 hosts input voltage 1001, power supplies 1003-1005, and monitoring and control circuit 1002. 48V input voltage 1001 is distributed to power supplies 1003-1005, which include, in this embodiment, power converters. Monitoring and control circuit 1002 is compatible with SMBus circuitry 1006 to facilitate the operation of PLA, as explained above. Further, power supplies 1003-1005 also operate to supply power to processors 102 and 103 and to Sherpa 104. Other appropriate power connections are within the scope of embodiments.

In the example embodiments depicted in FIG. 10, power board 404 distributes power to multi-processor module 400. Power board 404 also includes multiple power supplies 1003-1005.

Power board 404 includes, in this embodiment, an isolated, high efficiency, compact DC-DC converter that provides three DC output voltages—namely, PS_0Vout, PS_1Vout, and PS_2Vout, from respective power supplies 1003-1005. The specific voltages and power outputs shown in FIG. 10 are shown by way of example to illustrate relative voltages of the respective components in module 400 in a possible embodiment. However, those skilled in the art should recognize that other system power and voltages may be used without departing from the scope of the possible embodiments.

The 48V DC input voltage is input to power supplies 1003-1005. Power board 404 may, for example, include a compact multi-phase 450 Khz to 1.0 Mhz buck converter to down-regulate voltage delivered to power supplies 1003-1005. Those skilled in the art should appreciate that alternate embodiments of power board 404 may be implemented without departing from the scope of embodiments.

Power supplies 1003-1005 in this embodiment are programmable fixed duty cycle power converters with voltage feedback circuits that, respectively, monitor PS_0Vout, PS_1Vout, and PS_2Vout, through sense signals PS_0VSense, PS_1VSense, and PS_2VSense, to assure accurate voltage output. Monitoring and control circuit 1002 operates to control voltage and current through power board 404, to control the programmable configuration of power supplies 1003-1005, to control temperature-sensitive power output as a function of processor temperature, and/or to enable current margining.

In this embodiment, monitoring circuit 1002 senses parameters including power consumption, system voltage, and system temperature. Monitoring and control circuit 1002 controls power consumption by causing one or both of processors 102 and 103 to go from a multi-issue mode to a single-issue mode within module 400 to maintain such parameters within design limits. Single issue mode may be increased to multi-issue mode when power consumption is no longer constrained by temperature and power parameters.

In at least one embodiment, monitoring and control circuit 1002, on the basis of control parameters, adjusts the issue mode of individual processors within the module 400. Monitoring and control circuit 1002 may at the same time controls programmable power supplies 1003 and 1004 to reduce output voltages PS_0Vout, and PS_1Vout with the adjustment of issue mode. A single-issue mode may, for example, be increased multi-issue when power consumption is no longer constrained.

In the example shown as FIG. 10, module 400 is designed to have a maximum power consumption of 170 Watts. Accordingly, power supplies 1003-1005 may each provide an output voltage at an output current to deliver in total 170 W. This is a nonlimiting example because systems of alternate embodiments may not be constrained by these values for power.

Multi-processor module 400 includes processor 102 (processor 0) and processor 103 (processor 1). Power supply 1003 provides power to processor 102, as indicated by output voltage PS_0Vout. Processor 102 may be programmably configured to operate at a variety of voltages, or it may be designed to operate at a single voltage. As shown in FIG. 10, power supply 1003 accepts feedback information from processor 102 and uses this feedback information to assure that voltage PS_0Vout is maintained within established parameters. Specifically, processor 102 transmits a digital voltage identification signal, PS_0VID e.g., a four bit digital representation of voltage PS_0Vout, to power supply 1003, as well as a sensed voltage signal PS_0VSense. PS_0VID and PS_0VSense may alternatively be provided as output features of processor 102 or by circuitry with multi-processor module 400. Power supply 1003 may, for example, compare PS_0VID and PS_0VSense, and adjust voltage PS_0Vout to deliver the required voltage to processor 102. Power supply 1004 may similarly regulate output voltage PS_1Vout to processor 103 in the same manner using PS_1VID and PS_1VSense.

In this example embodiment, Sherpa 104 functions as an arbitrator between the processors 102 and 103 seeking to access fourth level external cache and DRAMs 201-204. Sherpa 104 may also provide other functions for module 400, as described herein. Sherpa 104 receives power from power supply 1005, as indicated by the output voltage PS_2Vout. Sherpa 104 senses output voltage PS_2Vout and provides a corresponding signal PS_2VSense indicating the magnitude of the sensed voltage to power supply 1005, which in turn uses signal PS_2VSense to regulate output voltage PS_2Vout within design parameters. Similarly, DRAMS 201-204 receive power from system cache power 1008.

In this example embodiment, inter-module SMBus 1007 is used to carry data and control signals between monitoring circuit 1002 and processor board 407 through SMBus circuitry 1006, and is used in support of the functions described herein.

The amount of power that may be consumed by module 400 may be subject to a variety of constraints, as described earlier. The task of controlling the operation of module 400 to implement these constraints resides with monitoring and control circuit 1002. For example, simultaneous and competing design constraints may include a maximum throughput of 170 W in power board 404 versus a maximum consumption of 80 W at either or both of the processors 102 or 103. Power consumption may be regulated by switching between multi-issue mode and single-issue mode on one or both of the processors 102 and 103. Additional power consumption may occur, for example, at local front side bus 106 (as in FIG. 1) (7 W), Sherpa 104 (15 W), and DRAM memory 201-204 (5.5 W), totaling 27.5 W. By way of further example, computational demands on processor 102 may require 90 W of power, which may necessitate switching to a single-issue mode to conserve or regulate power consumption by processor 102 to no more than 80 W. At the same time, processor 103 may also utilize 80 W. The combined power utilization of processors 102 and 103 in this example places total processor power consumption at 160 W which, when combined with the other power consumption of 27.5 W, exceeds the aforementioned 170 W power limit. Accordingly, monitoring and control circuit 1002 is programmed in this embodiment to allocate and distribute power between processors 102 and 103, and to control issue mode of processors 102 and 103 to maintain total power consumption within the 170 W throughput limitation.

In this embodiment, monitoring and control circuit 1002 senses input voltage. Other signals representing voltage and current may also be transmitted to monitoring and circuit 1002 from other components of module 400, to support the power limiting features of monitoring and control circuit 1002. At the same time, monitoring and control circuit 1002 may advantageously obtain direct sense measurements, without filtering, from an input power provider.

Referring back to FIGS. 4A and 4B, in the embodiments depicted therein, Micro-via technology is used to connect up Ball Grid Arrays ("BGAs") that are placed back-to-back in the Z-axis, with all routing between them completely done within the BGA pin fields. Such BGAs in the embodiments include Sherpa 104 and its associated pin field 416 (seen in FIG. 4B) and DRAMs 201-204. Thus, common ground, address, and power connections are shared by such BGAs by employing isolated ground, address, and power plane areas completely within the areas of those BGA pin fields. DRAMs 201-204, as mentioned earlier, are positioned on opposite sides of processor board 407. In this embodiment, pins on DRAMs 201-204 are positioned precisely so that common connections (e.g., address, control, power, and ground) are lined up with corresponding pins on each oppositely Z-axis positioned DRAM such that micro-vias (small diameter vias which only penetrate through a portion of a PCA) are used to provide interconnect from those pins to their respective plane areas. Sherpa 104 in these embodiments employs micro-vias in much the same way to connect up specific pins in its 1 mm pitch pin field to the 1.27 mm pitch pin field 416. This may minimize electrical contact length between pins and plane areas, and may also minimize routing congestion caused by traditional through-hole vias (large diameter vias which penetrate the full depth of a board) in processor board 407.

Electro-Magnetic Interference (EMI) containment is accomplished in the embodiments depicted in FIGS. 4A and 4B through a sandwich arrangement of frame 403, printed circuit assemblies (PCAs) with EMI stitching/fence employed as power board 404 and processor board 407, and heat spreader 401 to provide increased useable surface area on the PCAs while maintaining EMI containment versus a single-piece bathtub design of a frame and a heat spreader of traditional systems, which contain smaller PCAs. The bathtub design may be considered to be a design in which a frame is bathtub-shaped and thereby encloses one or more PCAs.

The example embodiments depicted in FIGS. 4A and 4B feature unified mechanical, electromagnetic compatibility and thermal management solutions, which include several components. All of the below-listed components are both thermally and electrically conductive in these example embodiments of FIGS. 4A and 4B:

- External heat sink (not shown) contacting heat spreader 401;
- Heat spreader 401;
- Perimeter on each printed circuit assembly (PCA) (power board 404 and processor board 407) including surface metal and a "fence of vias" to provide thermal and electrical conductivity through the PCAs while maximizing the surface area of the PCA available for other components;
- Frame 403;
- Thermal strap 402;
- Bolster plate 406 (to provide rigidity to processor board 407);
- Electrically conductive EMI gasketing (not shown);
- Thermally conductive interface pads (not shown); and
- Assembly hardware (shown throughout in FIGS. 4A and 4B).

Together these components form in those example embodiments:

- A rigid support structure for the entire assembly;
- A thermal path for conducting heat away from module components implemented as a common interface thermal solution;
- Radiative and conductive surfaces for transferring heat into the ambient environment; and
- A Faraday cage which both shields module components from external electromagnetic (EM) energy, and attenuates EM radiation generated by module 400.

Figure 11:
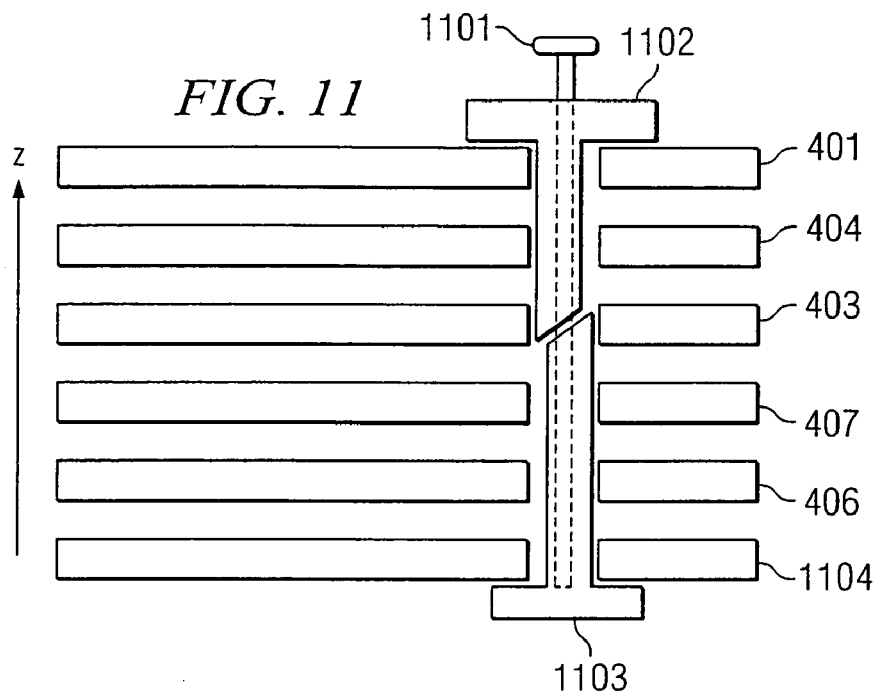
FIG. 11 is an exploded view of an exemplary wedgelock mechanism adapted according to certain embodiments.

The example implementation of module 400 in FIGS. 4A and 4B accommodates pin field 416 under Sherpa 104 in order to electrically couple module 400 to a socket on a system board adapted to receive a standard INTEL MADISON single-processor module. In addition to being electrically coupled to a system board, module 400 may also be physically connected to a system board. In any embodiment, there may be multiple mounting locations to physically secure module 400 to a system board. Some physical mounting locations close to a socket may use springs to provide a balanced force across the socket, and other physical mounting locations farther away from the socket may use a wedgelock mechanism, which locks boards in a Z-axis position with a force that is neutral in the Z-axis. FIG. 11 is an exploded view of an exemplary wedgelock mechanism adapted according to certain embodiments. Wedgelock mechanism embodiments utilize wedge portions 1102 and 1103 by drawing them together by an adjustment means such as screw 1101 to exert a retaining force orthogonal to an adjustment axis (the Z-axis in this case). For example, embodiments may include two wedge portions 1102 and 1103, having ends cut at an angle, e.g., each at a 45° angle, thereby providing a wedge shaped profile, and screw 1101 passed through both. Application of torque to screw 1101 operates to draw wedge portions 1102 and 1103 together, resulting in the wedge-shaped ends sliding against one another and, thus, causing sides of wedge portions 1102 and 1103 to move laterally in opposite directions thereby providing binding forces against the assembly into which the wedgelock mechanism is inserted. In this example embodiment, the assembly is module 400, made up of bolster plate 406, processor board 407, frame 403, power board 404, and heat spreader 401. Also in the assembly is system board assembly 1104 onto which module 400 is physically mounted. Accordingly, while bolster plate 406, processor board 407, frame 403, power board 404, and heat spreader 401 (all of module 400) may be held together by a traditional screw mechanism, module 400 may be physically mounted to system board assembly 1104 by a wedgelock mechanism. FIG. 11 is an exploded view such that the spaces between components 401, 403, 404, 406, and 407, are for clarity only, as many embodiments will include module 400 with components 401, 403, 404, 406, and 407 held together by other appropriate coupling devices. Other embodiments use may use alternate stack-up orders for a module and system board assembly as appropriate. Wedgelock mechanisms are but one kind of appropriate binding mechanism for module 400, and other kinds of binding mechanisms may be used in alternative embodiments.

Figure 12A:
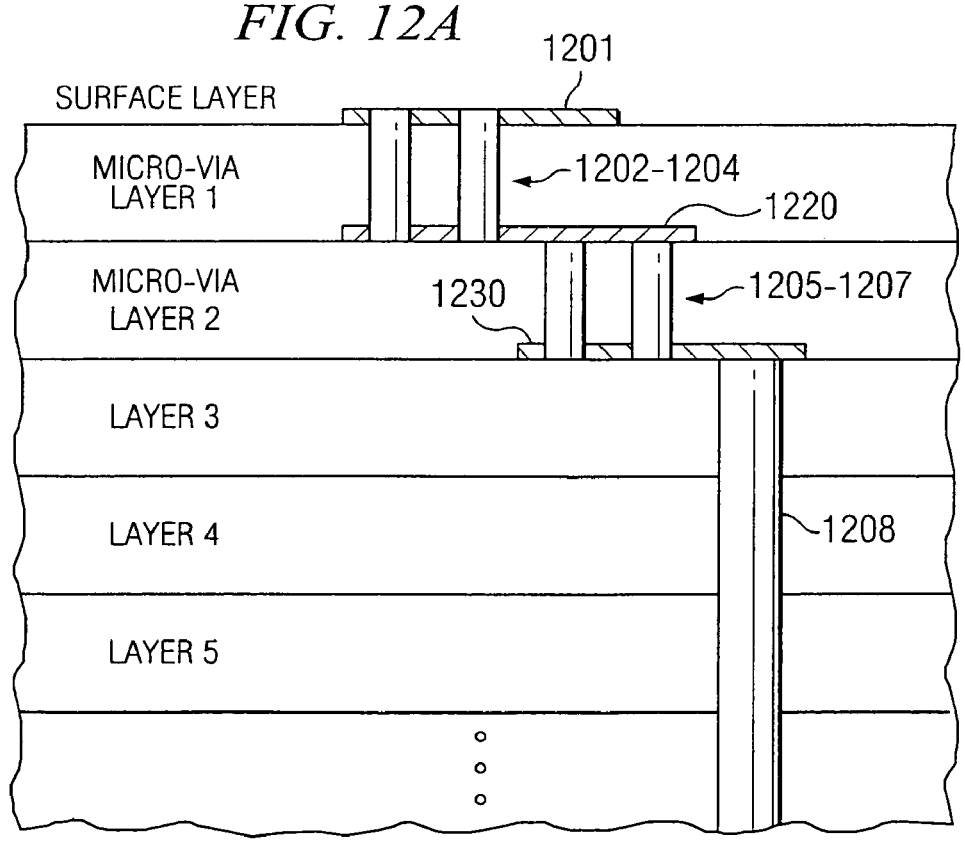
FIG. 12A is an illustration of a cross-section of a PCA employing exemplary pads and vias adapted according to certain embodiments.
Figure 12B:
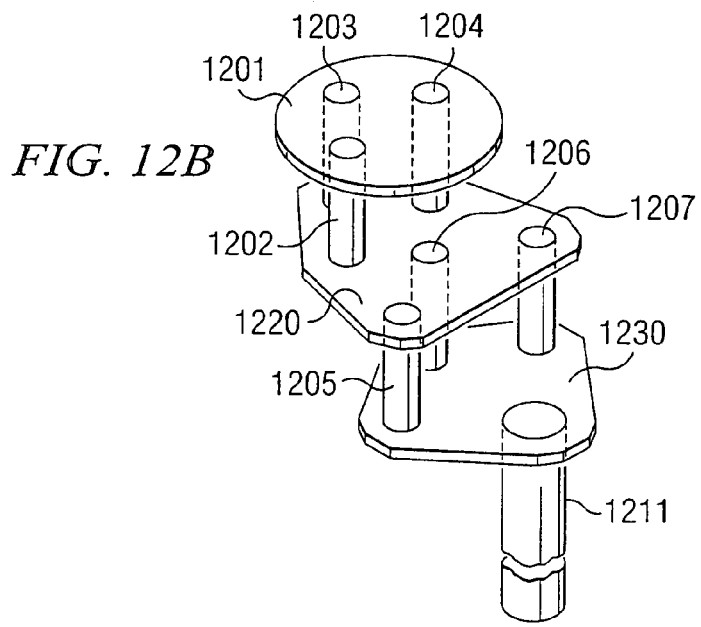
FIG. 12B is a tilted-angle view of FIG. 12A construction.

Multi-via in pad technology may be used in the example embodiments described in FIGS. 4A and 4B for enabling enough current carrying capacity to devices on boards 404 and 407, which use High Density Interconnect board technology. FIG. 12A is an illustration of a cross-section of a PCA employing exemplary pads and vias adapted according to certain embodiments. FIG. 12B shows a tilted-angle view of FIG. 12A construction. Vias 1202-1207 are micro-vias, which are of smaller diameter than buried thru-hole via 1208. In various embodiments, micro-vias are used to penetrate one PCA layer only, while thru-hole via 1208 in this embodiment is used to penetrate four or more of the layers in the PCA. Buried thru-hole vias (such as via 1208) may also be employed in various embodiments, such that those buried thru-hole vias may be connected by buried pads to a number of micro-vias which penetrate down to the buried pad from a higher layer. Because pad 1201 is conductive, vias 1202 to 1204 all carry the same electrical signal. Vias 1202-1204 penetrate one layer from the surface layer to micro-via layer 1 and contact pad 1220. Contact pad 1220 is conductive, such that vias 1205-1207 all carry the same signal, which is the same signal that is carried by vias 1202-1204. Micro-vias 1205-1207 penetrate one layer from micro-via layer 1 to micro-via layer 2. Via 1208 is a buried thru-hole via that is not a micro-via, and in this example, it penetrates the remaining layers of the PCA. Micro-vias 1202-1207 may be used to provide an electrical signal to a trace for routing to a component in the PCA. The areas of pads 1201, 1220, and 1230 accommodate multiple-vias, and such use of pads may be referred to as "multiple-via in pad" technology. The use of micro-vias 1202-1207 allows for a high-current capacity, low-impedance path from the surface of the PCA to buried thru-hole vias (such as via 1208) and traces (not shown) in other layers of the PCA.

Figure 13:
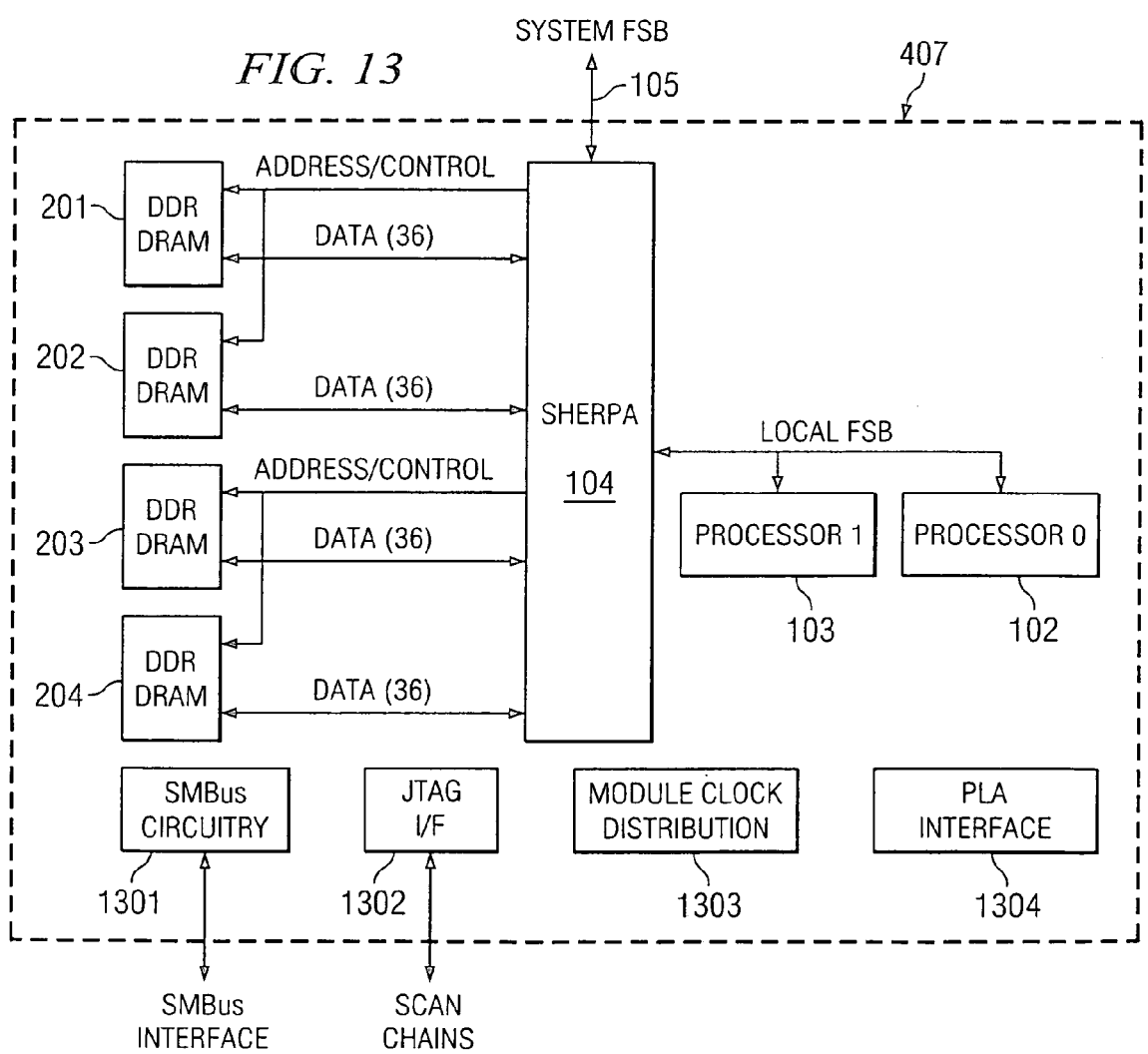
FIG. 13 is an illustration of an exemplary design of a processor board adapted according to certain embodiments.

FIG. 13 is an illustration of an exemplary design of a processor board adapted according to certain embodiments and illustrates the functional details for at least one example design of processor board 407. The following items included in the example design of FIG. 13 should be noted:

MADISON flip chip BGAs as processors 102 and 103;
Sherpa ASIC 104 that functions as System Front-Side Bus (FSB) interface, Local FSB interface, and fourth level external cache controller;
Fourth-level external cache provided by four Double Data Rate I/O (DDR) DRAMs 201-204; and
Placeholders for:
  Module Clock distribution 1303,
  SMBus Circuitry and Interface 1301,
  IEEE 1149.1 (JTAG) Scan Circuitry and Interface 1302, and
  Power Limiting Architecture Interface 1304.

While processors 102 and 103 in the example embodiments of FIGS. 4A, 4B, and 12 are MADISON processors, other embodiments may employ other processors, including, but not limited to, other IPF processors, such as MCKINLEY processors.

The example implementation of FIG. 13 of dual-processor board 407 includes an ASIC, such as Sherpa 104. Sherpa 104 provides a MCKINLEY-compatible Front-Side Bus (FSB) interface to a larger system (such as a system board in a server), as well as a separate FSB interface for processors 102 and 103. In addition, Sherpa 104 provides the fourth-level external cache interface to the error correction code (ECC)-protected bank of double data rate I/O memory devices 201-204. The Sherpa package target in this example implementation is a 1 mm pitch 33×33 flip chip ball-grid array (FCBGA); however, other embodiments may employ other appropriate packages.

In the example embodiments of FIGS. 4A and 4B Sherpa's 104 schedule and performance benefits best align with a MADISON processor; however other embodiments may employ Sherpa 104 compatible with other appropriate processors, including, but not limited to any MCKINLEY bus-based CPU (MCKINLEY or MADISON) and other CPUs now known or later developed. Sherpa 104 may be targeted for high-end server and workstation applications, both commercial and technical. Sherpa 104, in these example embodiments, operates with two IPF processor cores and 32 MB of cache housed in a module that operates in the same space, power, and thermal constraints as a single MCKINLEY module.

As also mentioned above, this example implementation of a dual-processor module includes a fourth-level external cache. For instance, four 2M×36 double data rate I/O memory devices 201-204, termed DDR DRAMs provide sufficient capability for an ECC-protected fourth-level external cache in this example embodiment; however, other embodiments may employ other appropriate memory devices. Future memory growth options for using 4M×36 devices may provided for by a processor board design.

The example implementations of module 400 depicted in FIGS. 4A and 4B may provide several technical advantages, including without limitation:

1) The module increases performance from that of a single-core processor by 1.5 to 2 times for transaction intensive processing for the same total power consumption;
2) The module fits into a form factor that is smaller than that of the current state of the art form factor for a single-processor system, wherein a form factor may be considered to be a shape and size of (or the dimensions of) a module; such a smaller form factor allows certain embodiments to interface with sockets adapted to receive standard single-processor modules and to fit into spaces adapted to receive standard single-processor modules. FIG. 14 is an illustration of an exemplary design of a module adapted according to certain embodiments placed next to a traditional, standard INTEL MADISON single-processor module. FIG. 14 compares module 400, according to embodiments disclosed in FIGS. 4A and 4B, to standard INTEL MADISON single-processor module 1401; FIG. 14 shows that module 400 is smaller than standard INTEL MADISON single-processor module 1401 in length and equal in height; and 3) The module solves multi-chip variable gap thermal interface packaging tolerance problems by using a VGTI (such as 408), which provides a tolerance of 60 mils and has a thermal resistance of as low as 0.2° C./W.

It should be understood that while an example implementation of module 400 is described above to provide a concrete example of the various features described herein, the inventive concepts described above are not limited in application solely to such module, but may instead be applied within various other implementations of a multi-processor module. Any such application is intended to be within the scope of the embodiments.

FIG. 15 depicts exemplary operational flow 1500 for operation of a plurality of processors according to at least one embodiment. In block 1501, a plurality of processors are connected on a local bus such that those processors are logically independent. In block 1502, an in-line cache control and bus bridge chip is logically interposed between the local bus and a system bus. In block 1503, the plurality of processors, the local bus and the in-line cache control and bus bridge chip are disposed in a module conforming to a standard single-processor module form factor. In block 1504 the plurality of processors in the in-line cache control and bus bridge chip are operated such that each processor processes data independently and simultaneously. In block 1505 power consumption is managed at a rate equal to or less than the power consumption of a standard single-processor module. Such managing in block 1505 may include features such as feature 1506, lowering an operating frequency of the processors and feature 1507, changing the state of the processors from a multi-issue mode to a single-issue mode.

FIG. 16 depicts an exemplary flow for operations of block 1504 as in FIG. 15. In block 1601 the module is connected to a system board through an interface compatible with standard single-processor module. The interface may be a socket adapted to receive a standard single-processor module. In block 1602, the system board is interfaced to a computer system platform. In block 1603, data is input to the system board from the computer system platform. In block 1604, that same data is input to the module from components in the system board via a system bus. In block 1605, that data is processed by a plurality of processors in the module such that each processor processes some of the data independently and simultaneously to other processors of the plurality. In block 1606, components of the system board receive the processed data from the module via the system bus.

Figure 17A:
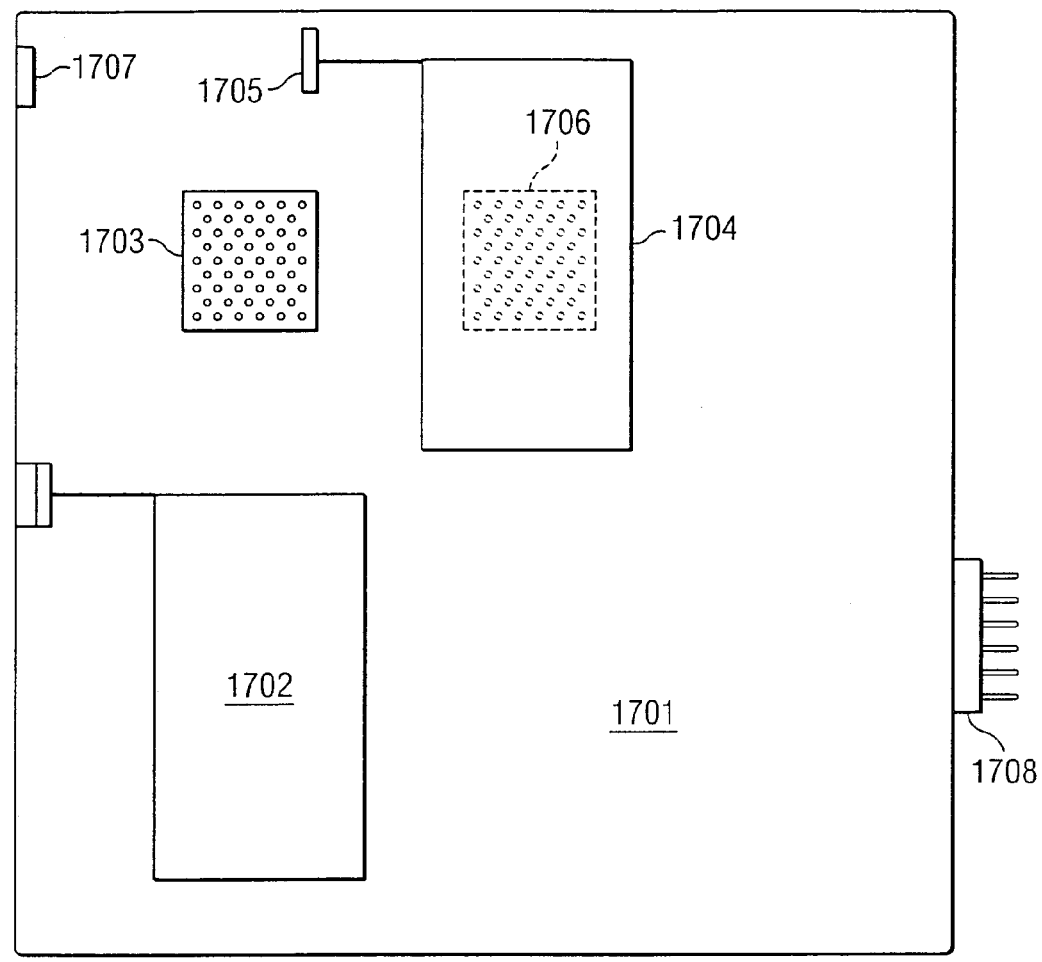
FIGS. 17A and 17B depict an exemplary system employing a multi-processor module adapted according to certain embodiments.
Figure 17B:
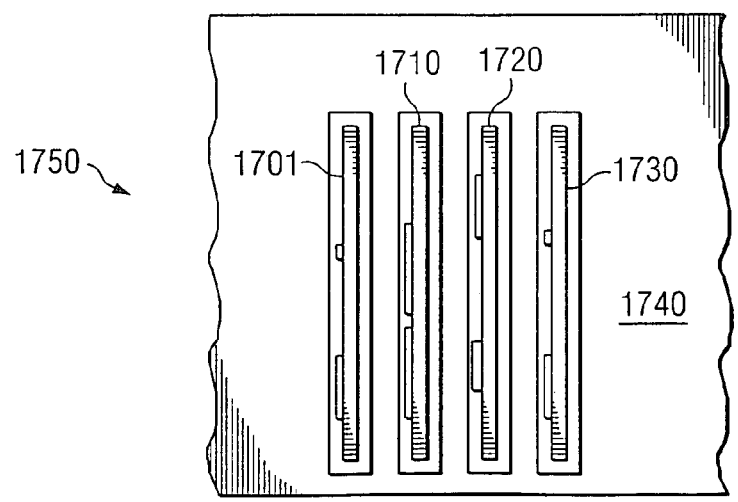

FIGS. 17A and 17B depict an exemplary system employing a multi-processor module adapted according to certain embodiments. Multi-processor module 1704 is implemented in system board 1701 and is thereby employed in computer system 1750. In FIG. 17A, module 1704 is in electrical communication with a computer system through system board 1701. System board 1701 includes socket 1703, which mates with connectors 1706 located underneath the Sherpa ASIC of module 1704. Any kind of connectors may be appropriate for use in connecting module 1704 to system board 1701, including, but not limited to, a pin field underneath module 1704, which mates with corresponding holes in socket 1703. Module 1704 includes flexible power cord 1705, which mates with power outlet 1707 to provide power to module 1704.

Also included in system board 1701 is module 1702, which may be a multi-processor module similar to module 1704 or may be a single-processor module. In this example embodiment, system board 1701 is adapted for use with standard single-processor modules and includes firmware which is adapted to communicate with a cache control and bus bridge chip, and module 1704 is a multi-processor module which is a drop-in replacement for a standard single-processor module. As such, system board 1701 may employ module 1704 with little or no modification. System board 1701 includes a system agent (not shown) which provides electrical communication between socket 1703 and system resources (such as memory and I/O, also not shown), and further provides electrical communication between socket 1703 and back plane connector 1708. Back plane connector 1708 provides electrical communication between system board 1701 and the rest of the components in the computer system 1750 (of FIG. 17B). Any kind of connectors may be appropriate for use in connecting system board 1701 to back plane 1740, including, but not limited to, a pin field on connector 1708, which mates with corresponding holes in back plane 1740.

FIG. 17B depicts a computer system employing a multi-processor module according to embodiments. Computer system 1750 includes system boards 1701, 1710, 1720, and 1730. System boards 1701, 1710, 1720, and 1730 are in communication with the system crossbar of computer system 1750 via mating connectors in back plane 1740 of computer system 1750. In this embodiment, computer system 1750 is adapted for use with standard single-processor modules. While system board 1701 includes multi-processor module 1704, system boards 1710, 1720, and 1730 may or may not also include multi-processor modules, but may include only standard single-processor modules or a combination of multi- and single-processor modules. As mentioned above, module 1704 is a drop-in replacement for a standard single-processor module, and as such, its implementation will require little or no modification of computer system 1750 or module 1701.

What is claimed is:

1. An apparatus comprising:
   a plurality of logically independent processors;
   a processor bus;
   a power board;
   a heat spreader; and
   a cache control and bus bridge device in communication with the plurality of processors such that it is logically interposed between the processors and the processor bus, and wherein the processors and cache control and bus bridge device and power board and heat spreader are disposed in a module form factor such that the apparatus is a drop-in replacement for a standard single-processor module.

2. The apparatus of claim 1 wherein the processors are IPF packaged processors.

3. The apparatus of claim 1 wherein a volume of the module form factor is less than or equal to a volume of a standard single-processor module.

4. The apparatus of claim 3 wherein the standard single-processor module is an ITANIUM 2 module.

5. The apparatus of claim 1 wherein the processors and cache control and bus bridge device are disposed on a processor board, and wherein the heat spreader is piggybacked onto the power board and the power board is piggybacked onto the processor board.

6. The apparatus of claim 5 wherein the power board is disposed between the processor board and the heat spreader and wherein a plurality of pedestals on the heat spreader extend through a plurality of holes in the power board thereby contacting one or more of the processor packages and cache control and bus bridge device such that both the processor board and the power board contact the heat spreader.

7. The apparatus of claim 6 wherein the pedestals each comprise a variable-gap thermal interface.

8. The apparatus of claim 7 wherein at least one variable gap thermal interface is a piston and spring thermal interface.

9. The apparatus of claim 8 wherein at least one variable gap thermal interface has a tolerance of 60 mils.

10. The apparatus of claim 1 further comprising a power board disposed in the module form factor, wherein the processors and cache control and bus bridge device are disposed on a processor board, and wherein the power board is piggybacked onto the processor board, and wherein a plurality of components of both the power board and processor board are arranged in a complementary skyline and interleaved component fashion.

11. The apparatus of claim 1 wherein the power board utilizes power limiting architecture.

12. The apparatus of claim 1 further comprising flexible power cable routing within a volume of the form factor.

13. The apparatus of claim 1 wherein the apparatus is included in a computing device comprising a plurality of similar apparatuses in communication with a system bus.

14. The apparatus of claim 1 further comprising a power board and a processor board, wherein the processors and cache control and bus bridge device are disposed on the processor board, and wherein the power and processor boards employ micro-vias, accommodated within areas of one or more conductive pads, to provide high current capacity, low impedance paths from surfaces of those boards to a plurality of buried vias and traces in underlying layers of those boards.

15. The apparatus of claim 1 further comprising a plurality of multi-processor modules in communication with said system bus.

16. A method comprising:
connecting on a local bus a plurality of processors such that the processors are logically independent;
logically interposing between the local bus and a processor bus an in-line cache control and bus bridge device;
disposing in a module conforming to a standard single-processor module form factor the plurality of processors, the local bus, and the in-line cache control and bus bridge device, said module comprising a piggyback power supply and a heat spreader; and
operating the plurality of processors and the in-line cache control and bus bridge device such that data input to each of the processors is processed independently and simultaneously.

17. The method of claim 16 wherein the operating the plurality of processors comprises:
connecting the module to a system board through an interface compatible with a standard single-processor module;
interfacing the system board to a computer system platform;
inputting data to the module from the system board via a system bus;
processing the data by a plurality of processors such that each processor processes some of the data independently and simultaneously to the other processors of the plurality; and
receiving by components in the system board processed data from the module via the system bus.

18. The method of claim 16 wherein the power supply comprises a board on which is disposed a plurality of components packed more densely than power components in a power board associated with a single-processor module.

19. The method of claim 16 further comprising managing a power consumption of the module at a rate equal to or less than a power consumption of a standard single processor module.

20. The method of claim 19 wherein managing comprises changing a state of the processors from a multi-issue mode to a single-issue mode.

21. The method of claim 19 wherein managing comprises lowering an operating frequency of the processors while maintaining a performance of each of the processors such that the processors together produce a performance equal to or better than that of a standard single-processor module.

22. The method of claim 19 wherein the processors together produce a performance of 1.5-2.0 times that of a standard single-processor module.

23. The method of claim 19 wherein a unit performance per Watt is kept at a maximum for the processors.

24. The method of claim 16 wherein operating the plurality of processors comprises exchanging data between the processors and a plurality of system components adapted to communicate with a single processor module such that the system components communicate with the plurality of processors as if the system components were communicating with a single-processor module.

25. The method of claim 16 wherein conforming to a standard single-processor module form factor comprises having a footprint of an area not greater than that of a standard single-processor module and having a volume not greater than that of a standard single-processor module.

26. A system comprising:
a plurality of processors mounted onto a processor board;
a power board;
a heat spreader disposed with the plurality of processors and the power board in a first module conforming to a standard single-processor module footprint, wherein the power board is piggybacked with regard to the processor board, wherein the heat spreader is piggybacked with regard to the power board, and wherein the heat spreader thermally contacts the power board and the processor board;
a computer system; and
a system board adapted to communicate with the computer system and comprising an interface adapted to communicate with a standard single-processor module, wherein the first module is coupled to the system board and is in communication with the system board and the computer system.

27. The system of claim 26 wherein the computer system is a server.

28. The system of claim 26 wherein the processor board comprise an in-line cache control and bus bridge device and a fourth level external cache coupled to the in-line cache control and bus bridge device.

29. The system of claim 26 wherein the first module is a drop-in replacement for a single-processor module.

30. The system of claim 26 wherein the first module is coupled to the system board by a wedgelock device.

31. The system of claim 26 further comprising a cooling strap, wherein the cooling strap and the heat spreader comprise a common interface thermal solution.

32. The system of claim 26, wherein said processors are in communication with a cache control and bus bridge device that is interposed between said processors and a system bus.

33. A multi-processor module comprising:
a plurality of processors;
a piggybacked power board;
a heat spreader; and
a cache control and bus bridge device that controls access to a common cache by the plurality of processors and electrically isolates the processors from a system bus, said cache control and bus bridge device being adapted to exchange data between the processors and a plurality of system components adapted to communicate with a single processor module such that the system components communicate with the plurality of processors as if the system components were communicating with a single-processor module.

34. The multi-processor module of claim 33 wherein the module is compatible with a single-processor module interface.

35. The multi-processor module of claim 33, wherein the processors are IPF packaged processors.

36. The multi-processor module of claim 33, wherein said first module is a drop-in replacement for a single-processor module.

37. An apparatus comprising a processor module including:
a processor board;
plural processor packages mounted on said processor board;
a bridge device for communicatively coupling said processor packages with a system bus, said bridge device being communicatively coupled to said processor packages;
a power board fixed to said processor board;
one or more power converters mounted on said power board; and
one or more connectors for attaching said processor board to a system board incorporating said system bus so that said system bus is communicatively coupled to said bridge device.

38. A processor module as recited in claim 37 wherein said processor board, said power board, said processor packages, said one or more power converters, said bridge device, and said one or more connectors are arranged so as to conform to a form factor associated with a standard single-processor module.

39. An apparatus as recited in claim 37 wherein the number of power converters exceeds the number of processor packages.

40. An apparatus as recited in claim 37 further comprising said system board and one or more additional processor modules attached to said system board, each of said modules including one or more processor packages, said processor modules communicating with each other via said system bus.

* * * * *

UNITED STATES PATENT AND TRADEMARK OFFICE
CERTIFICATE OF CORRECTION

PATENT NO. : 7,475,175 B2  Page 1 of 1
APPLICATION NO. : 10/800837
DATED : January 6, 2009
INVENTOR(S) : David A. Klein et al.

It is certified that error appears in the above-identified patent and that said Letters Patent is hereby corrected as shown below:

In column 3, line 23, delete "an d us" and insert -- and bus --, therefor.

In column 19, line 8, in Claim 6, delete "processor packages" and insert -- processors --, therefor.

Signed and Sealed this

Twelfth Day of May, 2009

JOHN DOLL
*Acting Director of the United States Patent and Trademark Office*